US012596325B2

(12) United States Patent
Noji et al.

(10) Patent No.: US 12,596,325 B2
(45) Date of Patent: Apr. 7, 2026

(54) PROCESS CARTRIDGE

(71) Applicant: CANON KABUSHIKI KAISHA, Tokyo (JP)

(72) Inventors: Shintaro Noji, Shizuoka (JP); Yuhei Terui, Shizuoka (JP); Takashi Kenmoku, Shizuoka (JP); Kodai Hayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/883,375

(22) Filed: Sep. 12, 2024

(65) Prior Publication Data

US 2025/0085659 A1 Mar. 13, 2025

(30) Foreign Application Priority Data

Sep. 12, 2023 (JP) ................................ 2023-147439
Aug. 21, 2024 (JP) ................................ 2024-139815

(51) Int. Cl.
*G03G 21/18* (2006.01)
*G03G 9/08* (2006.01)
*G03G 9/093* (2006.01)

(52) U.S. Cl.
CPC ....... *G03G 21/1814* (2013.01); *G03G 9/0827* (2013.01); *G03G 9/09342* (2013.01); *G03G 21/186* (2013.01)

(58) Field of Classification Search
CPC ............ G03G 21/1814; G03G 21/186; G03G 15/0808; G03G 9/0827; G03G 9/09342
See application file for complete search history.

(56) References Cited

U.S. PATENT DOCUMENTS

| | | | | |
|---|---|---|---|---|
| 9,335,667 | B1 | 5/2016 | Zona | |
| 2003/0022086 | A1* | 1/2003 | Iga | G03G 9/09708 430/108.1 |
| 2006/0029436 | A1* | 2/2006 | Toyoda | G03G 9/0827 399/285 |
| 2007/0098436 | A1 | 5/2007 | Arakawa | |
| 2009/0142677 | A1 | 6/2009 | Shitara | |
| 2010/0261112 | A1 | 10/2010 | Aruga | |
| 2013/0287450 | A1* | 10/2013 | Hayashi | G03G 15/0808 399/281 |
| 2014/0030645 | A1* | 1/2014 | Nomura | G03G 9/0827 430/109.1 |
| 2014/0270861 | A1 | 9/2014 | Fujita | |
| 2014/0349229 | A1* | 11/2014 | Morales-Tirado | G03G 9/0827 430/108.6 |

(Continued)

FOREIGN PATENT DOCUMENTS

| | | | |
|---|---|---|---|
| EP | 3654108 | A1 | 5/2020 |
| JP | 2002003213 | A | 1/2002 |

(Continued)

*Primary Examiner* — Sandra Brase
(74) *Attorney, Agent, or Firm* — Canon U.S.A., Inc. IP Division

(57) ABSTRACT

A process cartridge is configured such that a movement direction of a surface of a developing roller is opposite to a movement direction of a surface of a toner supplying roller in a position where the developing roller is in contact with the toner supplying roller, the developing roller and the toner supplying roller rotate to satisfy a peripheral speed ratio R of 1.1 to 2.5, and a toner satisfying predetermined requirements is used.

10 Claims, 6 Drawing Sheets

(56) References Cited

U.S. PATENT DOCUMENTS

| | | | | |
|---|---|---|---|---|
| 2015/0160576 | A1* | 6/2015 | Sugahara | G03G 9/09342 430/137.13 |
| 2018/0267420 | A1* | 9/2018 | Yamashita | G03G 9/0827 |
| 2025/0116945 | A1 | 4/2025 | Aoki | |

FOREIGN PATENT DOCUMENTS

| | | | |
|---|---|---|---|
| JP | 2011253203 | A | 12/2011 |
| JP | 2015041047 | A | 3/2015 |
| JP | 2015125258 | A | 7/2015 |
| JP | 2020079902 | A | 5/2020 |

* cited by examiner

PROCESS CARTRIDGE

BACKGROUND

Field

The present disclosure relates to a process cartridge used in a copying machine and a printer that use an electrophotographic method or an electrostatic recording method.

Description of the Related Art

In an image forming apparatus such as a printer that uses an electrophotographic image forming method (electrophotographic process), an electrophotographic photoreceptor (hereinafter, referred to as "photoreceptor") serving as an image carrying member is uniformly charged, and the charge photoreceptor is selectively exposed to light to form an electrostatic image on the photoreceptor. The electrostatic image formed on the photoreceptor is visualized as a toner image with a toner serving as a developer. Further, image recording is performed by transferring the toner image formed on the photoreceptor to a recording material such as recording paper or a plastic sheet and applying heat or a pressure to the toner image transferred onto the recording material so that the toner image is fixed on the recording material.

Such an image forming apparatus typically requires replenishment of a developer and maintenance of various process units. In order to facilitate an operation of replenish an image forming apparatus with a developer and maintenance of various process units, a system of forming a process cartridge that is attachable to and detachable from an image forming apparatus main body, by combining a photoreceptor, a charging unit, a developing unit, a cleaning unit, and the like in a frame to form a cartridge, has come into practical use. According to the process cartridge system, an image forming apparatus with excellent usability can be provided.

In recent years, a color image forming apparatus that forms a color image using developers of a plurality of colors has been widely used. A so-called in-line type image forming apparatus in which photoreceptors corresponding to each of image forming operations using developers of a plurality of colors are arranged in a row in a surface movement direction of a transfer material to which a toner image is transferred is known as the color image forming apparatus. Examples of the in-line type color image forming apparatus include an in-line type color image forming apparatus in which a plurality of photoreceptors are arranged in a row in a direction (for example, a horizontal direction) intersecting a vertical direction (gravitational direction). The in-line type image forming apparatus is a suitable image forming apparatus in terms that image formation is performed at a high speed and requirements such as development of a multi-function filter can be easily dealt with.

Further, examples of the image forming apparatus include an image forming apparatus in which a photoreceptor is disposed below an intermediate transfer member serving as a transfer material or a recording carrying member that conveys a recording material serving as a transfer material (see Japanese Patent Laid-Open No. 2011-253203).

In a case where the photoreceptor is disposed below the intermediate transfer member or the recording material carrying member, for example, a fixing device and a developing device (or exposure device) can be disposed at separate positions in a state of sandwiching the intermediate transfer member and the recording material carrying member in the image forming apparatus main body. Therefore, there is an advantage that the developing device (or the exposure device) is difficult to be affected by heat of the fixing device.

In recent years, there has been an increasing demand for improving the productivity, and a printer capable of performing high-speed printing has been required. As a cartridge configuration that enables high-speed printing, a cartridge configuration in which a toner is satisfactorily supplied by causing a difference in peripheral speed between the developing roller and the toner supplying roller has been suggested (see Japanese Patent Laid-Open No. 2015-41047 and Japanese Patent Laid-Open No. 2020-79902).

In the configuration described in Japanese Patent Laid-Open No. 2015-41047, since the movement direction of the surface of the developing roller is the same as the movement direction of the surface of the toner supplying roller in a position where the developing roller is in contact with the toner supplying roller, there is a problem in that undeveloped toner (development residual toner) is likely to be insufficiently scraped off, and image defects, so-called ghosts, in which an overcharged development residual toner affects image formation at the second rotation of the development roller are likely to occur.

Meanwhile, the configuration described in Japanese Patent Laid-Open No. 2020-79902 is a configuration in which ghosts are unlikely to occur because the movement direction of the surface of the developing roller is opposite to the movement direction of the surface of the toner supplying roller in a position where the developing roller is in contact with the toner supplying roller. However, there is a problem in that toner deterioration, such as migration or embedding of an external additive, is likely to occur due to a large stress applied to the toner in the position where the developing roller is in contact with the toner supplying roller. The deteriorated toner undergoes melt adhesion to a regulating member, and thus image defects, which are called development stripes, occur. Therefore, the configuration described in Japanese Patent Laid-Open No. 2020-79902 has a remaining problem in terms of extending the lifetime of the cartridge.

SUMMARY

That is, the present disclosure provides a process cartridge in which ghosts are unlikely to occur and image defects such as development stripes are unlikely to occur even in long-term use in a higher speed printer.

According to the present disclosure, there is provided a process cartridge that is attachable to and detachable from an image forming apparatus, the process cartridge including: a developing chamber, in which the developing chamber includes a toner, a developing roller that develops an electrostatic latent image with the toner, a regulating member that is disposed in contact with the developing roller and regulates a layer thickness of the toner carried by a surface of the developing roller, and a toner supplying roller that is disposed in contact with the developing roller and supplies the toner to the developing roller, a movement direction of the surface of the developing roller is opposite to a movement direction of a surface of the toner supplying roller in a position where the surface of the developing roller is in contact with the surface of the toner supplying roller, the developing roller and the toner supplying roller are formed such that a peripheral speed ratio R represented by Equation (E1) satisfies 1.1≤R≤2.5, $$R = V_{RS}/V_D \quad \text{(E1)}$$

(in Equation (E1), $V_{RS}$ represents an absolute value [m/sec] of a peripheral speed of the surface of the toner supplying roller, and $V_D$ represents an absolute value [m/sec] of a peripheral speed of the surface of the developing roller), the toner contains a toner particle and an external additive A, the toner has an average circularity of 0.955 or greater and 0.975 or less, a proportion of a particle having a circularity of 0.900 or greater and 0.930 or less in a circularity distribution of the toner is 2.0% by number or greater and 15.0% by number or less, the external additive A is a needle-like inorganic fine particle having a major axis of 100 nm or greater and 3000 nm or less, and a proportion of the toner particle having a surface where the external additive A is confirmed to be present is 30% by number or greater when the toner is observed using a scanning electron microscope.

Further features of the present disclosure will become apparent from the following description of exemplary embodiments with reference to the attached drawings.

DESCRIPTION OF THE EMBODIMENTS

Figure 1:
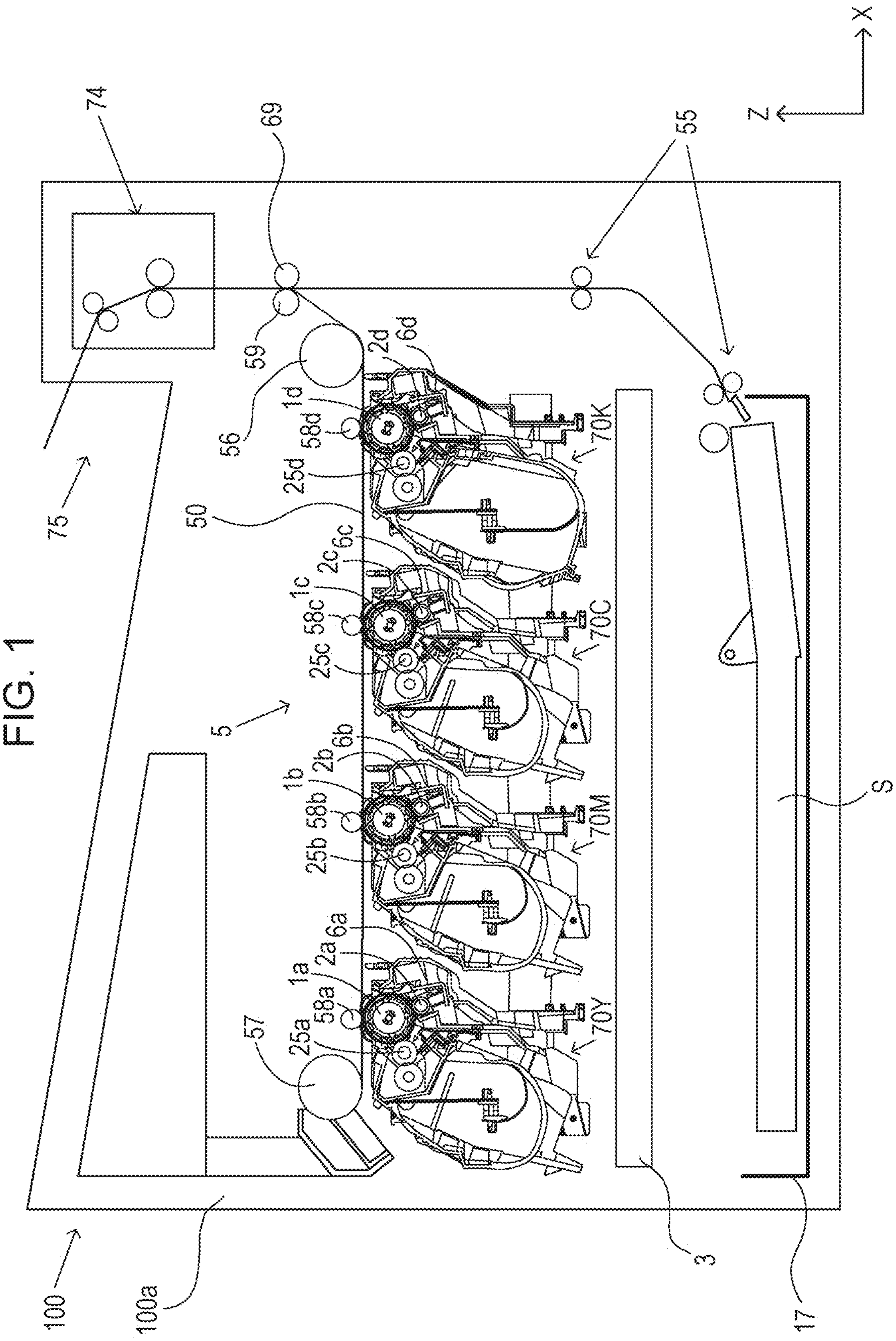
FIG. 1 is a schematic cross-sectional view showing an image forming apparatus to which the present disclosure can be applied.

Hereinafter, a process cartridge according to the present disclosure will be described in more detail with reference to the accompanying drawings. Here, the dimensions, the materials, the shapes, the relative dispositions, and the like of constituent components described in this embodiment are not intended to limit the scope of the present disclosure thereto unless otherwise specified. Further, the materials, the shapes, and the like of members described once in the following description are the same as those in the subsequent description. Well-known techniques or publicly known techniques in the technical field can be applied to the configurations or steps that are not described or shown in the drawings. Further, repeated description may not be provided.

The description of "XX or greater and YY or less" and "XX to YY" showing numerical ranges denotes numerical ranges including the lower limits and the upper limits as end points unless otherwise specified.

In a case where the numerical ranges are described in a stepwise manner, the upper limits and the lower limits of the respective numerical ranges can be optionally combined.

In order to deal with the above-described problems, a method of suppressing deterioration of a toner in a cartridge configuration has been examined in which a movement direction of a surface of a developing roller is opposite to a movement direction of a surface of a toner supplying roller, that is, a cartridge configuration which is excellent in suppressing occurrence of ghosts, but is likely to cause toner deterioration.

As a result, it has been found that the toner deterioration is suppressed by appropriately controlling the average circularity of the toner, the proportion of the particles with a relatively low circularity to be present, the shape of an external additive A, and the ratio of the external additive A to be present on the surface of the toner particles in a certain range of R represented by Equation (E1), and accordingly, the above-described problems can be solved.

That is, a process cartridge according to the present disclosure is a process cartridge that is attachable to and detachable from an image forming apparatus, the process cartridge including a developing chamber, in which the developing chamber includes a toner, a developing roller that develops an electrostatic latent image with the toner, a regulating member that is disposed in contact with the developing roller and regulates a layer thickness of the toner carried by a surface of the developing roller, and a toner supplying roller that is disposed in contact with the developing roller and supplies the toner to the developing roller, a movement direction of the surface of the developing roller is opposite to a movement direction of a surface of the toner supplying roller in a position where the surface of the developing roller is in contact with the surface of the toner supplying roller, the developing roller and the toner supplying roller are formed such that a peripheral speed ratio R represented by Equation (E1) satisfies 1.1≤R≤2.5, $$R = V_{RS}/V_D \quad \text{(E1)}$$

(in Equation (E1), $V_{RS}$ represents an absolute value [m/sec] of a peripheral speed of the surface of the toner supplying roller, and $V_D$ represents an absolute value [m/sec] of a peripheral speed of the surface of the developing roller), the toner contains a toner particle and an external additive A, the toner has an average circularity of 0.955 or greater and 0.975 or less, a proportion of a particle having a circularity of 0.900 or greater and 0.930 or less in a circularity distribution of the toner is 2.0% by number or greater and 15.0% by number or less, the external additive A is a needle-like inorganic fine particle having a major axis of 100 nm or greater and 3000 nm or less, and a proportion of the toner particle having a surface where the external additive A is confirmed to be present is 30% by number or greater when the toner is observed using a scanning electron microscope.

Hereinafter, the process cartridge of the present disclosure will be described in detail.

Image Forming Apparatus

FIG. 1 is a view showing a schematic configuration of an image forming apparatus 100 including the process cartridge according to the present disclosure in a stationary state on a horizontal surface as in actual use. The image forming apparatus 100 is an in-line type full color laser printer that employs an intermediate transfer type printer. As shown in FIG. 1, four process cartridges 70 (70Y, 70M, 70C, and 70K) that are attachable to and detachable from the image forming apparatus are mounted on the image forming apparatus by mounting members (not shown). Further, an upstream side of the process cartridge 70 in a mounting direction of the image forming apparatus 100 is defined as a front side, and a downstream side thereof in the mounting direction is defined as a rear side.

An electrophotographic photosensitive drum (hereinafter, referred to as a photosensitive drum) 1 (1*a*, 1*b*, 1*c*, and 1*d*) is disposed in each process cartridge 70. Further, process units such as a charging roller 2 (2*a*, 2*b*, 2*c*, and 2*d*), a developing roller 25 (25*a*, 25*b*, 25*c*, and 25*d*), and a cleaning member 6 (6*a*, 6*b*, 6*c*, and 6*d*) are integrally disposed around the photosensitive drum 1 of each process cartridge 70. The charging roller 2 uniformly charges the surface of the photosensitive drum 1. The developing roller 25 develops a latent image formed on the photosensitive drum 1 with a developer (hereinafter, referred to as a toner) for visualization. Further, the cleaning member 6 transfers the toner image formed on the photosensitive drum 1 to a recording medium and removes the toner remaining on the photosensitive drum 1. In addition, the details of the configurations and the positional relationships of the photosensitive drum 1, the charging roller 2, the developing roller 25, and the cleaning member 6 will be described below with reference to FIGS. 2 and 3.

Further, a scanner unit 3 that selectively exposing the photosensitive drum 1 to light based on image information to form a latent image on the photosensitive drum 1 is provided below the process cartridge 70 in the gravitational direction.

A cassette 17 containing a recording medium S is mounted on a lower portion of an apparatus main body 100*a*.

Further, a recording medium conveying unit is provided such that the recording medium S passes through a secondary transfer roller 69 and a fixing unit 74 and is conveyed to above the apparatus main body 100*a*. Further, an intermediate transfer unit 5 is provided above each process cartridge 70 (70Y, 70M, 70C, and 70K) as an intermediate transfer unit for transferring a toner image formed on each photosensitive drum 1 (1*a*, 1*b*, 1*c*, and 1*d*). The intermediate transfer unit 5 includes a driving roller 56, a driven roller 57, primary transfer rollers 58 (58*a*, 58*b*, 58*c*, and 58*d*) at positions facing the photosensitive drums 1 of each color, and a facing roller 59 facing the secondary transfer roller 69, and a transfer belt 50 is stretched across these rollers. Further, the transfer belt 50 faces all the photosensitive drums 1, circulatingly moves to come into contact with the photosensitive drums 1, and performs primary transfer from the photosensitive drums 1 to the transfer belt 50 by applying a voltage to the primary transfer rollers 58 (58*a*, 58*b*, 58*c*, and 58*d*). Further, the toner of the transfer belt 50 is transferred to the recording medium S by applying a voltage to the facing roller 59 and the secondary transfer roller 69 disposed inside the transfer belt 50.

In image formation, each photosensitive drum 1 is allowed to rotate, and the photosensitive drum 1 uniformly charged by the charging roller 2 is selectively exposed to light from the scanner unit 3. In this manner, an electrostatic latent image is formed on the photosensitive drum 1. This latent image is developed by the developing roller 25. In this manner, a toner image of each color is formed on each photosensitive drum 1. In synchronization with the image formation, registration roller pairs 55 convey the recording medium S to a secondary transfer position where the facing roller 59 and the secondary transfer roller 69 are in contact with each other in a state of sandwiching the transfer belt 50 therebetween. Further, the toner image of each color on the transfer belt 50 is secondarily transferred to the recording medium S by applying a transfer bias voltage to the secondary transfer roller 69. In this manner, a color image is formed on the recording medium S. The recording medium S on which the color image has been formed is heated and pressurized by the fixing unit 74 to fix the toner image. Thereafter, the recording medium S is discharged to a discharge unit 75 by a discharge roller 72. In addition, the fixing unit 74 is disposed in an upper portion of the apparatus main body 100*a*.

Process Cartridge

Figure 2:
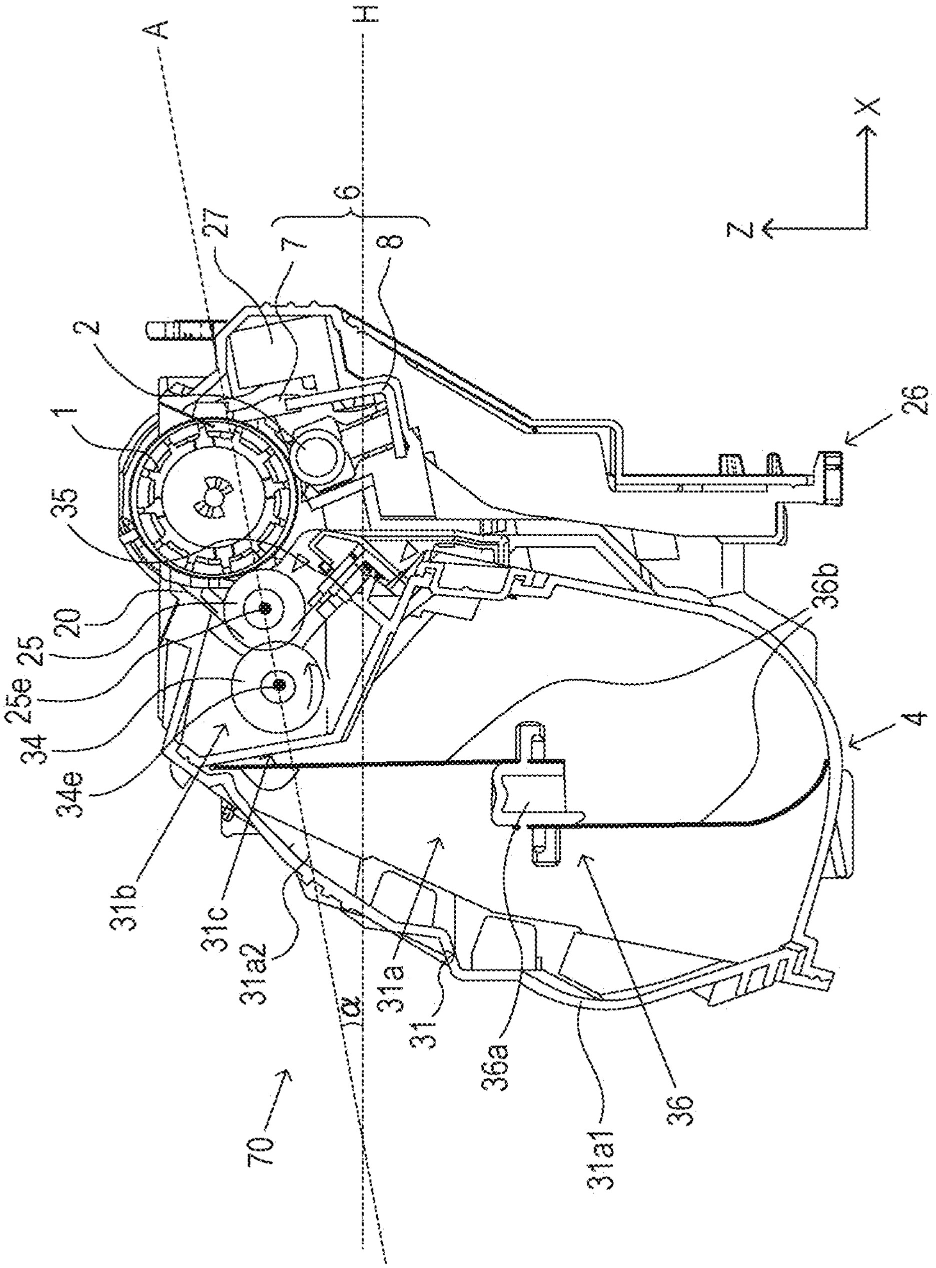
FIG. 2 is a schematic cross-sectional view showing a process cartridge according to examples to which the present disclosure can be applied.

Next, the process cartridge 70 to which the present disclosure has been applied will be described with reference to FIG. 2. FIG. 2 shows a main cross section of the process cartridge 70 accommodating the toner in a state of being mounted on the image forming apparatus 100 of FIG. 1. Further, the cartridge 70Y containing a toner of a yellow color, the cartridge 70M containing a toner of a magenta color, the cartridge 70C containing a toner of a cyan color, and the cartridge 70K containing a toner of a black color have the same configuration.

The process cartridge 70 includes a cleaning unit 26 and a developing unit 4. The cleaning unit 26 includes the photosensitive drum 1, the charging roller 2, and the cleaning member 6. Further, the developing unit 4 includes the developing roller 25.

The charging roller 2 and the cleaning member 6 are disposed on the periphery of the photosensitive drum 1 as described above. The cleaning member 5 includes an elastic member 7 formed of a rubber blade and a cleaning support member 8. A tip portion of the elastic member 7 formed of a rubber blade is disposed in contact with the photosensitive drum in a counter direction with respect to a rotation direction of the photosensitive drum 1. Further, the residual toner removed from the surface of the photosensitive drum 1 by the cleaning member 6 falls into a removed toner chamber 27.

The photosensitive drum 1 is rotationally driven in response to an image forming operation by transmitting a driving force of a main body driving motor (not shown) serving as a driving source. Here, when a drum coupling fixed to a longitudinal end portion of the photosensitive drum 1 is engaged with a main body side coupling present on a longitudinal axial line of the photosensitive drum 1, the driving force is input to the photosensitive drum 1. The charging roller 2 is rotatably attached to the cleaning unit 26 via a charging roller bearing, is pressurized against the photosensitive drum 1 by a charging roller pressing member, and rotates in conjunction with the photosensitive drum 1.

The developing unit 4 is formed of the developing roller 25 that rotates in contact with the photosensitive drum 1 and a developing frame 31 that supports the developing roller 25. The developing frame 31 is formed of a developing chamber 31*b* and a toner accommodating chamber 31*a* (toner accommodating unit), and the toner accommodating unit is disposed below the developing chamber in the vertical direction.

A toner supplying roller 34 that rotates in a direction indicated by an arrow C in contact with the developing roller 25 and a regulating member (developing blade 35) for regulating a toner layer on the developing roller 25 are disposed on the periphery of the developing roller 25. In the example described below, the outer diameter of the developing roller 25 is 12 mm, and the outer diameter of the toner supplying roller is 13.2 mm. In a state where the process cartridge 70 is mounted on the image forming apparatus 100, an angle α between a horizontal line H and a straight line A connecting a rotation center 25*c* of the developing roller 25 and a rotation center 34*e* of the toner supplying roller 34 is 9.85 degrees. However, the angle α is not limited thereto, and is, for example, in a range of 9.5° to 10.3°.

The developing roller 25 and the toner supplying roller 34 are rotationally driven in response to the image forming operation by transmitting a driving force of a main body driving motor (now shown) different from the driving source of the cleaning unit to the developing unit 4. The driving force is input by a driving input method carried out via a coupling similar to the case of the cleaning unit 26. The driving input method using a coupling is suitable from the viewpoint of rotational stability as compared with a driving input method carried out via a gear.

The developing roller 25 is an elastic body roller formed such that a conductive elastic rubber layer having predetermined volume resistivity is provided as an elastic layer in the periphery of a metallic core metal. The developing roller 25 is formed of a base layer and a surface layer. The base layer is formed of silicone rubber, the surface layer is formed of urethane rubber, and urethane bead particles are dispersed in the urethane rubber of the surface layer so that desired roughness is set. The developing roller 25 and the photosensitive drum 1 respectively rotate such that the surfaces thereof move in the same direction (direction from bottom to top in the present embodiment) in a facing portion (contact portion). In the present embodiment, the toner negatively charged by triboelectric charging with respect to a predetermined DC bias applied to the developing roller 25 is transferred only to a bright area potential portion due to a potential difference thereof to visualize the electrostatic latent image.

The regulating member (developing blade 35) is disposed below the developing roller 25, is in counter contact with the developing roller 25, and regulates the coating amount of the toner supplied by the toner supplying roller 34 and applies an electric charge. The developing blade 35 is formed of a plate-like member having flexibility and a support for the regulating member which fixes the plate-like member. The plate-like member is a member with a thickness of 80 μm, which is obtained by processing stainless steel (SUS) in a plate spring shape, and a contact portion positioned at a free end of the plate-like member is in contact with the developing roller 25 with a required contact pressure. The toner supplied onto the developing roller 25 is triboelectrically charged due to the friction between the developing blade 35 and the developing roller 25, and the layer thickness thereof is regulated at the same time as application of an electric charge. Further, in the present embodiment, a predetermined voltage is applied to the developing blade 35 from a blade bias power supply (not shown) to stabilize the toner coat.

The toner to which an electric charge has been applied adheres the surface of the developing roller 25 due to an image force with the developing roller 25. In a case where the adhesion force of the toner to the surface of the developing roller 25 exceeds the regulation force of the developing blade 35, the toner coat on the developing roller 25 is disturbed (so-called "regulation defects"). When regulation defects occur, image defects such as fogging in which the toner adheres to a white background of the image and an abnormal density occur.

Figure 3:
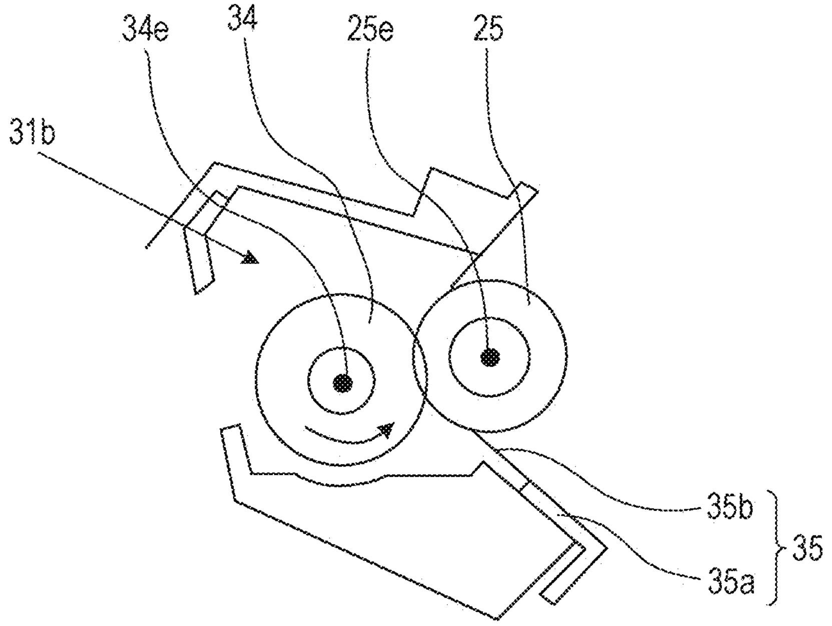
FIG. 3 is a schematic cross sectional view showing a developing chamber of the process cartridge according to examples to which the present disclosure can be applied.

Here, the developing blade 35 of the present embodiment will be described in detail. The developing blade 35 is formed of a supporting plate 35*a* (blade supporting portion) obtained by processing stainless steel and a plate-like member 35*b* (blade portion) having flexibility as shown in FIG. 3. The plate-like member is integrated with the supporting plate by performing YAG laser welding.

Figure 4:
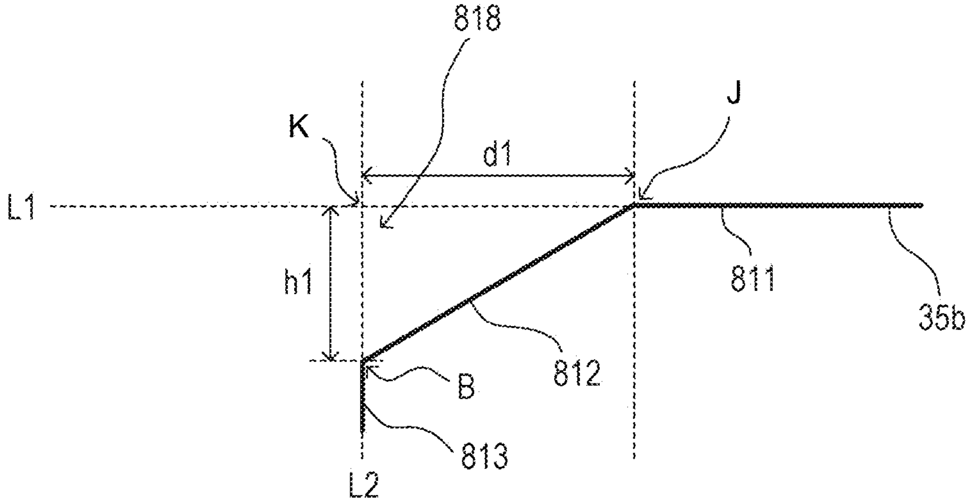
FIG. 4 is a conceptual cross-sectional view showing a transverse direction of a developing blade according to examples to which the present disclosure can be applied.

FIG. 4 is a conceptual cross-sectional view showing a transverse direction of the developing blade 35 at a free end tip portion according to the present disclosure. A surface 811 of FIG. 4 is a surface that mainly comes into contact with the developing roller 25.

In the present embodiment, a part of a "tip edge portion 818" on a side to come into contact with the developing roller 25 is scraped off by polishing processing on a tip (free end) side of the plate-like member 35*b* as shown in FIG. 4. A portion formed by being scraped off is formed on the entire longitudinal area of the plate-like member.

The developing blade 35 is provided at a free end of the plate-like member 35*b* in the transverse direction and includes a contact portion for coming into contact with the surface of the developing roller 25.

More specifically, before the tip of the developing blade 35 is subjected to polishing processing, a first surface 811 (first portion) that is a surface on a side to come into contact with the developing roller 25 intersects with a third surface 813 (third portion) orthogonal to the first surface 811 on a cross section orthogonal to the longitudinal direction to form "tip edge portion 818" described above. Further, the tip edge portion 818 is scraped off by performing polishing processing so that a second surface 812 (second portion) connects the first surface 811 with the third surface 813 is formed. A tip point of the first surface 811 on a free end side is defined as a point J, and a tip point of the second surface 812 on a free end side is defined as a point B in a state after the polishing processing. Further, a virtual line extending from the first surface 811 in a free end direction is defined as L1. Further, a point where a virtual line L2 orthogonal to the virtual line L1 and passing through the point B intersects with the virtual line L1 is defined as a point K. Here, a distance between the point B and the point K is defined as h1, and a distance between the point A J and the point G-K is defined as d1. In the example described below, "h1=15 μm" and "d1=40 μm" are satisfied.

Here, a method of performing polishing processing on the developing blade 35 used in the present disclosure will be described. The plate-like member before being bonded to the support member is fixed to a pedestal in a state of being sandwiched between the pedestal and a pressing member.

An abrasive film wound around a rubber roller is in contact with the tip portion of the plate-like member in a state where a load is applied to the abrasive film. In the example described below, a wrapping film sheet with a grain size of #800 is used as the abrasive film, and a load of 500 g (4, 9N) is applied to the rubber roller.

The abrasive film on the rubber roller is disposed in a fixed state, and the pedestal moves right and left in the longitudinal direction so that the tip portion of the plate-like member is rubbed against the abrasive film and is thus finely scraped off.

The amount of the plate-like member to be scraped off is proportional to the distance where the plate-like member is rubbed against the abrasive film, and the scraped amount increases as the rubbed distance increases and the scraped amount decreases as the distance decreases. That is, the amount of the tip edge portion of the plate-like member to be scraped off can be changed by controlling the moving amount of the pedestal. The polishing method is merely an example, and the present disclosure is not limited thereto as long as the tip shape of the developing blade can be processed to a desired shape.

Figure 5:
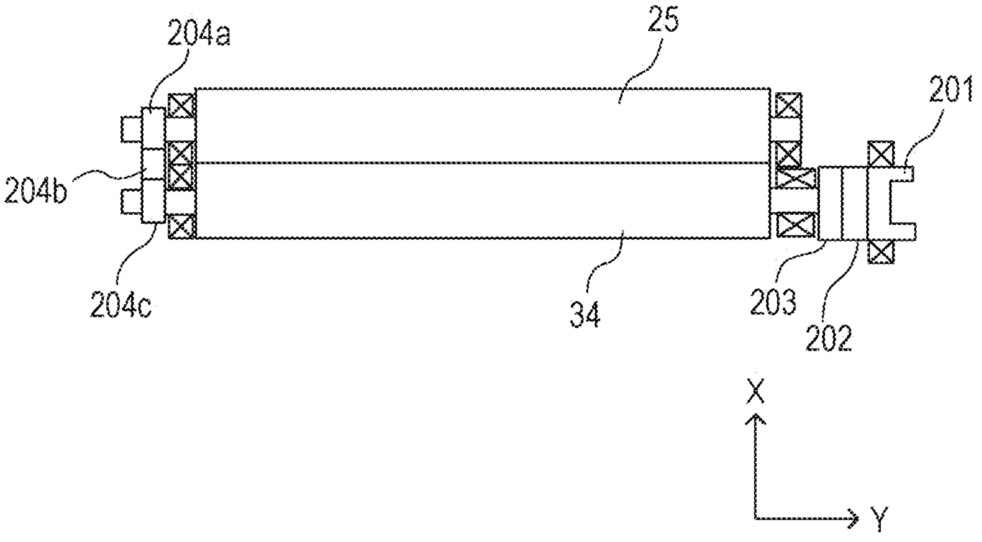
FIG. 5 is a view showing a driving/input method with respect to a toner supplying roller according to examples to which the present disclosure can be applied.
Figure 6:
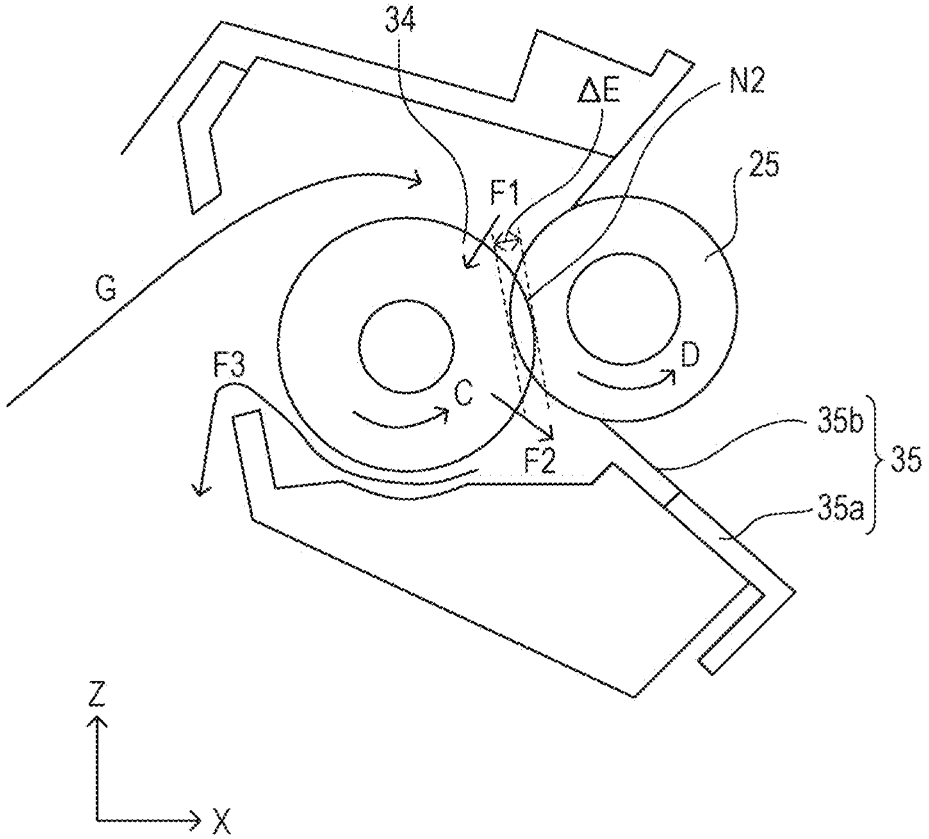
FIG. 6 is a view showing movement of a toner inside a developing device according to examples to which the present disclosure can be applied.

The toner supplying roller 34 is in contact with the developing roller 25 at a nip portion N2 (FIG. 6 shown below), and is rotationally driven in response of the image forming operation by receiving a driving force of a driving motor (not shown). The description thereof will be provided below with reference to FIG. 5.

The driving force from the main body driving motor is transmitted to a coupling 201 (driving force receiving unit) provided at an axial end portion of the toner supplying roller 34, and the driving force is transmitted to the toner supplying roller 34 through an intermediate 202 and a drive transmission member 203 (the intermediate 202 and the drive transmission member 203 are first driving force transmitting units). The driving force of the toner supplying roller 34 is transmitted to the developing roller 25 by gears (204*a* to 204*c*) provided between the toner supplying roller 34 and the developing roller 25 so that the developing roller 25 rotates (the gear 204 is a second driving force transmission unit, and the gear 204*a* is a third driving force transmission unit). Specifically, the gear 204*c* fixed to the toner supplying roller 34 rotates to transmit the driving force to an idler gear 204*b*, and thus the idler gear 204*b* rotates. When the idler gear 204*b* rotates, the driving force is transmitted to the gear 204*a* fixed to the developing roller 25, and thus the developing roller 25 rotates along with the gear 204*a*.

In the present embodiment shown in FIGS. 1 and 2, the driving force from the apparatus main body 100*a* to the developing unit 4 is input from the longitudinal axial line of the toner supplying roller 34, but in a case where a configuration in which the driving force from the apparatus main body 100*a* to the developing unit 4 is input from the longitudinal axial line of the developing roller 25 is employed, drive input positions for the cleaning unit 26 and the developing unit 4 approach each other because development is performed in a state where the photosensitive drum 1 and the developing roller 25 are in contact with each other. Such disposition of the input unit makes it difficult to simply configure the drive input unit of the apparatus main body 100*a*, which is not suitable when a more stabilized drive input unit is configured at a low cost.

On the contrary, in the present embodiment, since the driving force to the developing unit 4 is input from the longitudinal axial line of the toner supplying roller 34, the distance between the drive input position for the cleaning unit 26 and the drive input position for the developing unit 4 can be increased, which is more suitable when a drive input unit of the apparatus main body 100*a* is configured.

Meanwhile, since the configuration in which the driving force from the apparatus main body 100*a* is transmitted to the developing roller through the toner supplying roller 34 is required to drive the driving roller 25 through a plurality of gears, the rotational stability of the developing roller 25 is degraded as compared with the configuration in which the driving force is transmitted to the developing roller 25. As a result, the regulation force of the developing blade 35 is destabilized in some cases, and thus this configuration is disadvantageous in terms of regulation defects.

Further, the toner supplying roller 34 and the developing roller 25 rotate in the contact position (nip portion N2) with a peripheral speed difference, and the toner is supplied to the developing roller 25 while the residual toner on the developing roller 25 is recovered by this operation.

The configuration according to the present disclosure is a configuration in which the movement direction of the surface of the developing roller is opposite to the movement direction of the surface of the toner supplying roller at the nip portion N2 of the toner supplying roller, and the rollers rotate such that the peripheral speed ratio R represented by Equation (E1) satisfies 1.1≤R≤2.5 in a case where the peripheral speed of the toner supplying roller 34 at the nip portion N2 is defined as $V_{RS}$ and the peripheral speed of the developing roller 25 is defined as $V_D$.

$$R = V_{RS}/V_D \tag{E1}$$

That is, a rotational angle speed ratio λ represented by Equation (E2) "λ=ωRS/ωD" between the toner supplying roller 34 and the developing roller 25 satisfies "1.1≤λ×rRS/rD≤2.5" in a case where the radius of the toner supplying roller 34 is defined as rRS and the rotational angle speed thereof is defined as ωRS, and the radius of the developing roller 25 is defined as rD and the rotational angle speed thereof is defined as ωD.

Further, in the example described below, since the radius of the toner supplying roller is 3.3 mm and the radius of the developing roller is 3.0 mm, "λ≈1.14" is satisfied.

In a case where the toner supplying roller and the developing roller rotate in the same direction at the contact portion, the residual toner on the developing roller is insufficiently recovered, and thus image defects called ghosts are likely to occur due to overcharging of the residual toner. Further, similarly to a case where R is less than 1.1, the residual toner on the developing roller is insufficiently recovered, and thus image defects called ghosts are likely to occur due to overcharging of the residual toner. Further, in a case where R is greater than 2.5, toner deterioration and development stripes accompanied by member melt adhesion occur due to a large stress applied to the toner at the nip portion N2.

The peripheral speed ratio R is, for example, "1.2≤R≤1.5".

Further, the toner supplying roller 34 and the developing roller 25 are in contact with each other with a predetermined inroad amount, that is, a recess amount ΔE in which the toner supplying roller 34 is formed into a recess shape by the developing roller 25.

The toner supplying roller 34 includes a conductive support and a foam layer supported by the conductive support. Specifically, the toner supplying roller 34 is provided with a core metal electrode having an outer diameter of φ5 (mm) as a conductive support and a urethane foam layer as a foam layer formed of an open-cell body (open-cell) formed by air bubbles being connected in the periphery of the core metal electrode, and rotates in a direction indicated by C in the figure. When urethane of the surface layer is formed into an open-cell body as described above, a large amount of toner can enter the inside of the toner supplying roller 34. Further, the resistance of the toner supplying roller 34 in the example described below is $1\times10^{9}$ (Ω).

Further, in the example described below, the inroad amount of the toner supplying roller 34 to the developing roller 25, that is, a recess amount ΔE in which the toner supplying roller 34 is formed into a recess shape by the developing roller 25 is set to 1.0 mm.

Here, a method of measuring the resistance of the toner supplying roller 34 will be described. The toner supplying roller 34 comes into contact with an aluminum sleeve having a diameter of 30 mm such that the inroad amount described below reaches 1.5 mm. When the aluminum sleeve is allowed to rotate, the toner supplying roller 34 rotates in conjunction with the aluminum sleeve at 30 rpm.

Next, a DC voltage of −50 V is applied to the developing roller 25. In this case, a resistor of 10 kΩ is provided on an earth side, and the resistance of the toner supplying roller 34 is calculated by measuring the voltage at both ends of the resistor and calculating the current. In the present embodiment, the surface cell diameter of the toner supplying roller 34 is set to be in a range of 50 μm to 1000 μm.

Here, the cell diameter denotes the average diameter of foam cells in an optional cross section, and the maximum cell diameter is obtained by measuring the area of the maximum foam cell from an enlarged image of the optional cross section and converting this area into a perfect circle-equivalent diameter. Further, the average diameter is an average value of respective cell diameters similarly converted from cell areas of respective remaining cells after foam cells having a cell diameter of ½ or less of the maximum cell diameter are eliminated as noise.

The toner supplied to the surface of the developing roller 25 from the toner supplying roller 34 is frictionally charged by friction between the regulating member (developing blade) 35 and the developing roller 25, and the layer thickness is regulated at the same time as the application of the electric charge. Thereafter, the toner is conveyed to the contact portion (developing unit) between the photosensitive drum 1 and the developing roller 25, and transferred to a bright area potential portion. The residual toner remaining on the surface of the developing roller 25 is returned to the inside of a developing container again, recovered from the surface of the developing roller 25 by the toner supplying roller 34, and accumulated inside of the toner supplying roller 34.

Here, the flow of the toner inside the developing chamber 31*b* will be described with reference to FIG. 6. FIG. 6 is an enlarged schematic cross-sectional view showing the inside of the developing chamber 31*b*, and shows movement of the toner conveyed to the toner supplying roller 34 by a toner conveying member 36 shown in FIG. 2.

Some of the toner G conveyed to an upper portion of the toner supplying roller 34 by the toner conveying member 36 is sucked into the toner supplying roller 34 due to restoration of the toner supplying roller 34 downstream of the nip portion N2 in the rotation direction of the toner supplying roller 34 (F1), and accumulated inside the toner supplying roller 34 along with the residual toner accumulated inside the toner supplying roller 34 recovered from the surface of the developing roller 25. Further, the toner is conveyed downstream of the nip portion N2 in the rotation direction of the toner supplying roller 34 due to the rotation of the toner supplying roller 34 in the direction indicated by C. The toner accumulated inside the toner supplying roller 34 is ejected due to deformation of the toner supplying roller 34 caused when the toner supplying roller 34 comes into contact with the developing roller 25 downstream in the rotation direction of the toner supplying roller 34 (F2).

The toner that has not reached the surface of the developing roller 25 in the toner ejected from the toner supplying roller 34 is gradually conveyed by the propulsive force in a direction of a developing opening (opening portion) due to the jetting force caused by the ejection from the toner supplying roller 34, passes through the developing opening, and is returned to the toner accommodating chamber 31*a* (F3).

When the toner is satisfactorily circulated between the developing chamber 31*b* and the toner accommodating chamber 31*a* as described above, deterioration of the toner is suppressed, occurrence of aggregation of the toner is suppressed even in a case where an image with a low printing ratio is continuously output, and thus a high-quality image can be stably output.

Here, when the flow (F3) of the toner returning to the toner accommodating chamber 31*a* is insufficient, the toner is compressed and aggregated in a region below the toner supplying roller 34 and the developing roller 25. In this manner, the toner enters the nip portion N2 between the toner supplying roller 34 and the developing roller 25, and the contact of the toner supplying roller 34 with the developing roller 25 is insufficient. A region where the residual toner on the developing roller 25 cannot be sufficiently recovered by the toner supplying roller 34 is generated, a specific toner is carried around by the developing roller 25 and passes through the contact portion between the regulating member (developing blade 35) and the developing roller 25 more than necessary, and thus an over-charged toner is generated.

As a result, the adhesion force of the toner exceeds the regulation force of the regulating member (developing blade 35), and accordingly, regulation defects occur in some cases.

Such a phenomenon is likely to occur, for example, in a case where an image with a low printing ratio is continuously output in a low-temperature and low-humidity environment. This is because the residual toner recovered from the developing roller 25 by the toner supplying roller 34 is accumulated in the developing chamber 31*b*. Since the residual toner recovered from the developing roller 25 is charged, the toner is likely to be electrostatically aggregated. In this manner, the flowability of the toner inside the developing chamber 31*b* is degraded, the flow (F3) of the toner returning to the toner accommodating chamber 31*a* is insufficient, and the toner is likely to be aggregated in a region below the toner supplying roller 34 and the developing roller 25.

In order to deal with this, a method of disposing a toner stirring member below the toner supplying roller 34 inside the developing chamber 31*b* to create the flow (F3) of the toner returning to the toner accommodating chamber 31*a* may be used. However, since toner deterioration is accelerated due to the friction between the toner and the toner stirring member inside the developing chamber 31*b* when the toner stirring member is provided inside the developing chamber 31*b*, toner melt adhesion to the developing roller 25 is observed in a case where image with a low printing ratio is continuously output. Further, the toner stirring member is required to be provided as an additional member in addition to the toner supplying roller 34 inside the developing chamber 31*b*, and thus the configuration of the apparatus is complicated. Therefore, in the present embodiment, no members that are driven by motor drive are disposed inside the developing chamber 31*b* in addition to the developing roller 25 and the toner supplying roller 34.

Further, in the configuration in which no members other than the developing roller 25 and the toner supplying roller 34 are disposed inside the developing chamber 31*b*, the inner wall of the developing chamber 31*b* is set as follows with respect to the toner supplying roller 34 in order to efficiently use the toner inside the developing chamber 31*b*. The description will be provided in detail with reference to FIG. 7.

Figure 7:
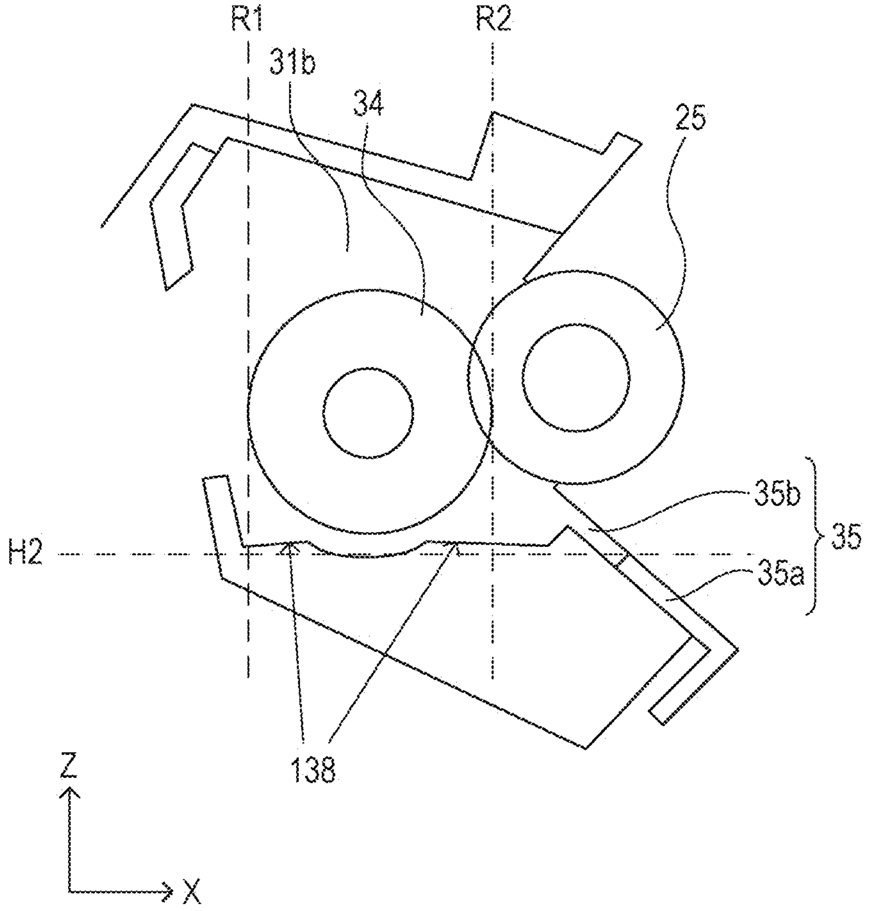
FIG. 7 is a view describing a positional relationship between an inner wall of the developing chamber and a support end of the developing blade according to examples to which the present disclosure can be applied.

R1 and R2 in FIG. 7 are tangents (vertical lines) to the outer peripheral surface of the toner supplying roller 34, which extend in the vertical direction. Further, a horizontal line H2 is a horizontal line passing through a support end of the regulating member (developing blade 35). At least a part of a region between R1 an R2 on the inner wall of the developing chamber 31*b* is above the horizontal line H2 in the vertical direction (region 138 in the figure). In this manner, the amount of the toner remaining in the developing chamber 31*b* without being used for printing can be further reduced, and the toner inside the developing chamber 31*b* can be more efficiently used.

Further, as shown in FIG. 2, a blowout prevention sheet 20 is disposed as a developer contact sheet for preventing the toner from leaking from the developing frame 31 in contact with the developing roller 25.

Further, the toner accommodating chamber 31*a* of the developing frame 31 is provided with the toner conveying member 36 for stirring the contained toner and conveying the toner to the toner supplying roller 34. As shown in FIG. 2, the toner conveying member 36 is formed of a stirring shaft 36*a* that can rotate by a driving force from the apparatus main body 100*a* and a sheet member 36*b* that is attached to the stirring shaft 36*a* and rotates along with the stirring shaft 36*a*, and the sheet member 36*b* has elasticity.

Next, the toner conveyance of the developing unit will be described. The sheet member 36*b* of the toner conveying member in the toner accommodating chamber 31*a* is provided such that the free end of the toner conveying member is in contact with the wall surface of the toner accommodating unit in a region A upstream of the opening portion 31*c* (communication port) in the rotation direction of the toner conveying member. Further, the sheet member 36*b* is deformed against elasticity as the toner conveying member rotates such that the free end side rather than the rotation axis side is upstream in the rotation direction of the toner conveying member.

That is, the sheet member 36*b* comes into contact with a deforming unit 31*al* on the inner surface of the toner accommodating unit in accordance with the rotation thereof. In this manner, the sheet member 36*b* receives a force from the deforming unit 31*al*. As a result, the sheet member 36*b* is deformed against the elastic force of the sheet member 36*b*. Further, the sheet member 36*b* rotates in a state of being in contact with the deforming unit 31*a*1, the toner is conveyed in a state of being carried on the surface downstream in the rotation direction thereof. In the present embodiment, the deforming unit 31*al* denotes a site (also referred to as a region A) of the inner wall of the toner accommodating chamber as shown in FIG. 2, from which the sheet member 36*b* is separated.

Further, the free end of the toner conveying member is released from the contact with the wall surface of the toner accommodating unit in a predetermined position (also referred to as a position B) in a restoring unit 31*a*2 downstream of the region A in the rotation direction of the toner conveying member and upstream of the opening portion in the rotation direction of the toner conveying member. In this case, the deformed toner conveying member is elastically restored, and the conveyed toner flies toward the communication port. In the examples described below, the restoring unit 31*a*2 is disposed above the horizontal surface of the conveying member including the rotation axis.

Therefore, the contact of the restoring unit 31*a*2 with the inner wall of the sheet member 36*b* is released after the tip of the sheet member on the free end side passes through the deforming unit 31*a*1 as the sheet member 36*b* rotates. In this manner, the sheet member 36*b* is released from a state of being deformed by the deforming unit 31*a*1 and is restored to a natural state (original shape) by the elastic restoration force of the sheet member 36*b*. The toner conveyed by being carried on the sheet member 36*b* due to a change in shape of the sheet member 36*b* in the restoration direction flies against gravity toward the opening portion 31*c*. The opening portion 31*c* is positioned downstream of the restoring unit 31*a*2 in the rotation direction of the sheet member 36*b*. Some of the toner flied toward the opening portion 31*c* is conveyed to the developing chamber 31*b*. Meanwhile, the toner that has not reached inside the developing chamber 31*b* falls into the toner accommodating chamber 31*a*, remains at the bottom of the toner accommodating chamber 31*a*, and is returned to the original state again. The toner is stirred and conveyed by repeating this cycle.

Further, the boundary portion between the deforming unit 31*a*1 and the restoring unit 31*a*2 is below the lower end of the opening portion 31*c* (communication port), the rotation center of the toner conveying member 36 and the rotation center of the developing roller 25 are positioned on the same side with respect to the vertical line passing through the boundary portion as viewed in the axial line direction of the developing roller 25, and the maximum value of the radius of rotation of the toner conveying member 36 is greater than the distance between the rotation center of the conveying member and the lower end of the communication port.

The configuration in which the deforming unit 31*a*1 and the restoring unit 31*a*2 described above are provided is a configuration advantageous for increasing the efficiency of conveying the toner to the developing chamber 31*b*, but this configuration is likely to disrupt the flow (F3) of the toner returning to the toner accommodating chamber so that the regulation defects tend to occur.

In the present embodiment, the length of the rotation axis of the sheet member 36*b* in the natural state in the radius direction of rotation is set to be greater than the distance from the rotation axis to the lower end of the developing opening in the same direction. The present configuration is advantageous for increasing the efficiency of conveying the toner to the developing chamber 31*b*, but is likely to disrupt the flow (F3) of the toner returning to the toner accommodating chamber 31*a* so that the regulation defects tend to occur.

Further, two sets of sheet members 36*b* are attached in a position shifted from the attachment direction on the stirring shaft 36*a* in order to enable a sufficient amount of toner to be conveyed to the developing chamber 31*b* from the toner accommodating chamber 31*a*. The present configuration is advantageous for increasing the efficiency of conveying the toner to the developing chamber 31*b*, but is likely to disrupt the flow (F3) of the toner returning to the toner accommodating chamber 31*a* so that the regulation defects tend to occur.

Toner

Next, the toner according to the present disclosure will be described in more detail.

The toner according to the present disclosure is a toner containing toner particles and an external additive A, in which the toner has an average circularity of 0.955 or greater and 0.975 or less, the proportion of the particles having a circularity of 0.900 or greater and 0.930 or less in a circularity distribution of the toner is 2.0% by number or greater and 15.0% by number or less, the external additive A is a needle-like inorganic fine particle having a major axis of 100 nm or greater and 3000 nm or less, and the proportion of the toner particles having a surface where the external additive A can be confirmed to be present is 30% by number or greater when the toner is observed using a scanning electron microscope.

The present inventors have considered the mechanism by which the toner with the above-described configuration used in the process cartridge according to the present disclosure exhibits the effects of the present disclosure as follows.

The external additive A according to the present disclosure is needle-like inorganic fine particles. Due to the presence of the needle-like inorganic fine particles on the toner surface, the needle-like inorganic fine particles function as a spacer when the toner passes through the contact portion between the toner supplying roller and the developing roller and the contact portion between the developing roller and the regulating member, and thus development stripes derived from toner deterioration can be suppressed.

Further, the circularity of the toner is also an important item related to the toner deterioration. When the toner has a shape close to a sphere, that is, the circularity of the toner increases, the contact area between each member and the toner can be minimized, which is suitable from the viewpoint of the toner deterioration. However, in a cartridge configuration that enables high-speed printing, the above-described needle-like inorganic fine particles roll on the surface of the toner particles in a case where the circularity of the toner increases, and thus the spacer effect tends to be difficult to exhibit. In the present disclosure, the toner having a high overall average circularity contains a toner having a partially low average circularity. In the toner with a low average circularity, the needle-like inorganic fine particles are difficult to roll on the surface of the toner, and thus the spacer effect of the needle-like inorganic fine particles is likely to be exhibited. Even when the needle-like inorganic fine particles roll on the surface of the toner, the spacer effect of the needle-like inorganic fine particles is more likely to be maintained than the case of the spherical toner, and the spacer effect can be maximized. The present inventors have considered that the effects of the present disclosure are exhibited by the above-described mechanism.

The average circularity of the toner according to the present disclosure is 0.955 or greater and 0.975 or less. In a case where the average circularity thereof is less than 0.955, since the contact area between the toner and each member is extremely large even when the spacer effect of the needle-like inorganic fine particles is exhibited, the toner deterioration and the development stripes accompanied by member melt adhesion occur. Meanwhile, in a case where the average circularity is greater than 0.975, the proportion of the particles having a circularity of 0.900 or greater and 0.930 or less described below is difficult to control to a desired range.

The toner according to the present disclosure is formed such that the proportion of the particles having a circularity of 0.900 or greater and 0.930 or less is 2.0% by number or greater and 15.0% by number or less in the circularity distribution of the toner described above. The toner having a circularity of 0.900 or greater and 0.930 or less and containing needle-like inorganic fine particles on the surface of the toner is considered to be a toner that can maximize the spacer effect.

Hereinafter, the toner having a circularity of 0.900 or greater and 0.930 or less will be referred to as "deformed toner". In a case where the proportion of the deformed toner is less than 2.0% by number, the spacer effect is insufficient, and the toner deterioration and development stripes accompanied by member melt adhesion occur. Meanwhile, in a case where the proportion of the deformed toner is greater than 15.0% by number, the effect of the deformed toner having no needle-like inorganic fine particles on the surface of the toner cannot be ignored. In the deformed toner having no needle-like inorganic fine particles on the surface of the toner, since the contact area between the toner and each member is large and the spacer effect of the needle-like inorganic fine particles cannot be expected, the toner deterioration and the development stripes accompanied by member melt adhesion occur.

The toner having the above-described toner shape can be produced by a chemical toner production method of obtaining toner particles in an aqueous medium, such as an emulsion aggregation method or a suspension polymerization method. Specifically, the toner shape can be obtained by performing a spheronization step, a cooling step, and an annealing step in the production step.

Examples of the spheronization step include a heat treatment step of performing a heat treatment, for example, at 90° C. or higher and, for example, 92° C. or higher and 95° C. or lower.

Examples of the cooling step include a step of performing a cooling treatment at a cooling rate of 0.1° C./sec or greater, for example, 0.5° C./sec or greater, for example, 2° C./sec or greater, and for example, 4° C./sec or greater.

Examples of the annealing step include a heat treatment step of performing a heat treatment at a temperature at which the glass transition temperature (Tg) of the toner is maximized for 5 hours or shorter.

The toner shape of the present disclosure is likely to be achieved by performing the above-described steps under appropriate conditions.

In a case where the major axis of the external additive A is less than 100 nm, since the external additive A rolls in all directions on the toner surface, the spacer effect cannot be sufficiently obtained, and the toner deterioration and development stripes accompanied by member melt adhesion occur. In a case where the major axis of the external additive A is greater than 3000 nm, desorption of the external additive A from the toner surface is likely to occur, and thus the spacer effect cannot be sufficiently obtained, and the toner deterioration and development stripes accompanied by member melt adhesion occur. For the same reason as described above, the major axis thereof is, for example, 500 nm or greater and 2000 nm or less and, for example, 800 nm or greater and 1700 nm or less.

Further, in the embodiment of the present specification, the term "needle-like" may denote particles having an irregular shape, an elongated shape, a needle shape, a rice shape, a rod shape, a butterfly shape, or a bowtie shape. When the external additive A has a needle-like shape, since the external additive is difficult to roll on the toner surface and the direction of rolling is limited to a minor axis direction, the spacer effect is more likely to be exhibited.

From the viewpoint of further improving the spacer effect described above, the external additive A has an aspect ratio of, for example 5.0 or greater, for example, 6.0 or greater, and for example, 8.0 or greater. The upper limit thereof is not particularly limited, but is, for example, 20.0 or less and, for example, 16.0 or less from the viewpoint that particles with a suitable particle diameter are likely to be produced.

When the toner of the present disclosure is observed using a scanning electron microscope, the proportion of the toner particles in which the presence of the external additive A on the toner surface can be confirmed is 30% by number of greater. In a case where the proportion of the toner particles having a surface where the external additive A can be confirmed to be present is less than 30% by number, the proportion of the particles that cannot obtain the spacer effect of the external additive A is extremely large, and thus the effects of the present disclosure cannot be sufficiently obtained. For the same reason as described above, the proportion thereof is, for example, 40% by number or greater and, for example, 50% by number or greater.

Further, the proportion of the toner particles having a surface where the external additive A can be confirmed to be present can be controlled by appropriately adjusting the conditions for external addition.

The external additive A may have a specific resistance of $1.0\times10^5$ Ω·cm or greater and $1.0\times10^8$ Ω·cm or less. In a case where the specific resistance thereof is in the above-described range, the balance between the charging of the toner and leakage of the electric charge is excellent, and the initial charge rising properties immediately after rising of the main body are enhanced. For the same reason as described above, the specific resistance thereof is, for example, $1.0\times10^6$ Ω·cm or greater and $5.0\times10^7$ Ω·cm or less.

The external additive A may satisfy the ranges of the physical properties described above, and specific examples of the external additive A include titanium oxide particles and aluminum oxide particles. Among these, the external additive A may include titanium oxide particles. The specific resistance of the external additive A is likely to be set in the above-described desired ranges when the external additive A includes titanium oxide particles. The external additive A may include rutile type titanium oxide particles.

In the toner according to the present disclosure, the amount of boron atoms to be present in the toner particles is, for example, 0.1 ppm by mass or greater and 100.0 ppm by mass or less. When the toner particles contain boron atoms, the electric charge is appropriately received and transferred between or within the toner particles, and thus the retention performance of the electric charge of the toner can be stabilized from the initial stage to the last stage of use.

A method of allowing the toner particles to contain boron atoms is not particularly limited. For example, boron atoms can be contained in the toner particles by externally adding boric acid to the toner particles or by using boric acid as an aggregating agent according to an aggregation method. Boron atoms are likely to be introduced to the vicinity of the surface of the toner particles by adding boric acid as an aggregating agent. Boron atoms may be used in a state of organic boric acid, a borate, boric acid ester, or the like at the stage of using boron atoms as a raw material. In a case where the toner particles are produced in an aqueous medium, boron atoms is, for example, added in the form of a borate from the viewpoints of the reactivity and the production stability, and specific examples thereof include sodium tetraborate and ammonium borate. In addition, borax can be used.

Borax is represented by a sodium tetraborate decahydrate ($Na_2B_4O_7$), and changed to boric acid in an acidic aqueous solution, and thus borax can be used in a case of being used in an aqueous medium in an acidic environment.

Constituent Component of Toner

Each component constituting the toner and a method of producing the toner will be described in more detail below.

Binder Resin

The toner particles contain a binder resin. The content of the binder resin is, for example, 50% by mass or greater with respect to the total amount of the resin component in the toner particles.

The binder resin is not particularly limited, and examples thereof include a styrene acrylic resin, an epoxy resin, a polyester resin, a polyurethane resin, a polyamide resin, a cellulose resin, a polyether resin, and a mixed resin and a composite resin of these resins. Among these, a styrene acrylic resin and a polyester resin are suitable from the viewpoints of low cost, availability, and excellent low-temperature fixability.

Polyester Resin

The polyester resin can be obtained by selecting suitable compounds from among a polycarboxylic acid, a polyol, a hydroxycarboxylic acid, and the like, combining the compounds, and synthesizing the combined compounds by a known method of the related art, such as a transesterification method or a polycondensation method.

The polycarboxylic acid is a compound containing two or more carboxy groups in a molecule. Among examples of the polycarboxylic acid, a dicarboxylic acid is a compound containing two carboxy groups in one molecule and can be used.

Examples of the dicarboxylic acid include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, and cyclohexanedicarboxylic acid.

Examples of the polycarboxylic acid other than the dicarboxylic acid include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid, and n-octenylsuccinic acid. There may be used alone or in combination of two or more kinds thereof.

The polyol is a compound containing two or more hydroxyl groups in one molecule. Among examples of the polyol, the diol is a compound containing two hydroxyl groups in one molecule, and can be used.

Specific examples of the polyol include ethylene glycol, diethylene glycol, triethylene glycol, 1,2-propylene glycol, 1,3-hexanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, diethylene glycol, triethylene glycol, dipropylene glycol, polyethylene glycol, polypropylene glycol, polytetramethylene ether glycol, 1,4-cyclohexanediol, 1,4-cyclohexanedimethanol, 1,4-butenediol, neopentyl glycol, 1,4-cyclohexanediol, polytetramethylene glycol, hydrogenated bisphenol A, bisphenol A, bisphenol F, bisphenol S, and alkylene oxide (ethylene oxide, propylene oxide, and butylene oxide) adducts of the above-described bisphenols.

Among these, alkylene glycol having 2 to 12 carbon atoms and alkylene oxide adducts of bisphenols are suitable, and combinations of alkylene oxide adducts of bisphenols and alkylene glycol having 2 to 12 carbon atoms is particularly suitable.

Examples of the tri- or higher valent include glycerin, trimethylolethane, trimethylolpropane, pentaerythritol, hexamethylolmelamine, hexaethylolmelamine, tetramethylol benzoguanamine, tetraethylol benzoguanamine, sorbitol, trisphenol PA, phenol novolac, cresol novolac, and alkylene oxide adducts of the above-described tri- or higher valent polyphenols. These may be used alone or in combination of two or more kinds thereof.

Styrene Acrylic Resin

Examples of the styrene acrylic resin include homopolymers formed of the following polymerizable monomers, copolymers obtained by combining two or more kinds of homopolymers, and mixtures thereof.

Examples of the styrene acrylic resin include a styrene-based monomer such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, or p-phenylstyrene;

a (meth)acrylic monomer such as methyl(meth)acrylate, ethyl(meth)acrylate, n-propyl(meth)acrylate, iso-propyl (meth)acrylate, n-butyl(meth)acrylate, iso-butyl(meth)acrylate, tert-butyl(meth)acrylate, n-amyl(meth)acrylate, n-hexyl(meth)acrylate, 2-ethylhexyl(meth)acrylate, n-octyl (meth)acrylate, n-nonyl(meth)acrylate, cyclohexyl(meth) acrylate, benzyl(meth)acrylate, dimethyl phosphate ethyl (meth)acrylate, diethyl phosphate ethyl(meth)acrylate, dibutyl phosphate ethyl(meth)acrylate, 2-benzoyloxyethyl (meth)acrylate, (meth)acrylonitrile, 2-hydroxyethyl(meth) acrylate, (meth)acrylic acid, or maleic acid; a vinyl ether-based monomer such as vinyl methyl ether or vinyl isobutyl ether; a vinyl ketone-based monomer such as vinyl methyl ketone, vinyl ethyl ketone, or vinyl isopropenylketone; and polyolefins such as ethylene, propylene, and butadiene.

A polyfunctional polymerizable monomer can be used as the styrene acrylic resin as necessary. Examples of the polyfunctional polymerizable monomer include diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, neopentyl glycol di(meth)acrylate, tripropylene glycol di(meth) acrylate, polypropylene glycol di(meth)acrylate, 2,2'-bis(4-((meth)acryloxydiethoxy)phenyl) propane, trimethylolpropane tri (meth)acrylate, tetramethylolmethane tetra(meth)acrylate, divinylbenzene, divinylnaphthalene, and divinyl ether.

Further, a known chain transfer agent and a known polymerization inhibitor can be further added to the toner in order to control the polymerization degree.

Examples of a polymerization initiator for obtaining the styrene acrylic resin include an organic peroxide-based initiator and an azo-based polymerization initiator.

Examples of the organic peroxide-based initiator include benzoyl peroxide, lauroyl peroxide, di-α-cumyl peroxide, 2,5-dimethyl-2,5-bis(benzoylperoxy) hexane, bis(4-t-butylcyclohexyl) peroxydicarbonate, 1,1-bis(t-butylperoxy) cyclododecane, t-butylperoxymaleic acid, bis(t-butylperoxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide, and tert-butyl peroxypivalate.

Examples of the azo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobismethylbutyronitrile, and 2,2'-azobis-(methylisobutyrate).

Further, a redox-based initiator obtained by combining an oxidizing substance and a reducing substance can also be used as the polymerization initiator.

Example of the oxidizing substance include hydrogen peroxide, an inorganic peroxide of a persulfate (a sodium salt, a potassium salt, or an ammonium salt), and an oxidizing metal salt of a tetravalent cerium salt.

Examples of the reducing substance include a reducing metal salt (a divalent iron salt, a monovalent copper salt, or a trivalent chromium salt, ammonia, a lower amine (an amine having 1 or more and 6 or less carbon atoms, such as methylamine or ethylamine), an amino compound such as hydroxylamine, a reducing sulfur compound such as sodium thiosulfate, sodium hydrosulfite, sodium hydrogen sulfite, sodium sulfite, or sodium formaldehyde sulfoxylate, lower alcohol (having 1 or more and 6 or less carbon atoms), ascorbic acid or a salt thereof, and a lower aldehyde (having 1 or more and 6 or less carbon atoms).

The polymerization initiator is selected with reference to a 10-hr half-life temperature, and is used alone or in the form of a mixture.

The amount of the polymerization initiator to be added changes depending on the target polymerization degree, but is typically 0.5 parts by mass or greater and 20.0 parts by mass or less with respect to 100.0 parts by mass of the polymerizable monomer.

Release Agent

A known wax can be used in the toner as a release agent.

Specific examples thereof include petroleum-based waxes such as paraffin wax, microcrystalline wax, and petrolatum, and derivatives thereof, montan waxes and derivatives thereof, hydrocarbon waxes obtained by using the Fischer-Tropsch method and derivatives thereof, polyolefin waxes such as polyethylene and derivatives thereof, and natural waxes such as carnauba wax and candelilla wax and derivatives thereof, and the derivatives include oxides, block copolymers with vinyl monomers, and graft modified products.

Further, examples of the waxes include alcohols such as higher aliphatic alcohol; fatty acids such as stearic acid and palmitic acid, acid amides, esters, and ketones thereof; hydrogenated castor oil and derivatives thereof, vegetable waxes, and animal waxes. These may be used alone or in combination.

Among these, polyolefin, hydrocarbon wax obtained by using the Fischer-Tropsch method, or petroleum-based wax can be used from the viewpoint that the developability and the transferability tend to be improved. Further, an antioxidant may be added to these waxes in a range where the characteristics of the toner are not affected.

Further, from the viewpoints of the phase separation properties with respect to the binder resin and the crystallization temperature, suitable examples thereof include higher fatty acid esters such as behenyl behenate and dibehenyl sebacate.

The content of the release agent is, for example, 1.0 parts by mass or greater and 30.0 parts by mass or less with respect to 100.0 parts by mass of the binder resin.

The melting point of the release agent is, for example, 30° C. or higher and 120° C. or lower and, for example, 60° C. or higher and 100° C. or lower. In a case where a release agent having a melting point of 30° C. or higher and 120° C.

or lower is used, a release effect is efficiently exhibited, and a wider fixing region is ensured.

Plasticizer

A crystalline plasticizer in the toner according to the present disclosure can be used for improving sharp melt properties. The plasticizer is not particularly limited, and known plasticizers used in toners as described below can be used.

Examples of the plasticizer include esters of monohydric alcohol and aliphatic carboxylic acid, such as behenyl behenate, stearyl stearate, and palmityl palmitate, or esters of carboxylic acid and aliphatic alcohol; esters of dihydric alcohol and aliphatic carboxylic acid, such as ethylene glycol distearate, dibehenyl sebacate, and hexanediol dibehenate, or esters of carboxylic acid and aliphatic alcohol; esters of trihydric alcohol and aliphatic carboxylic acid, such as glycerin tribehenate, or esters of trihydric carboxylic acid and aliphatic alcohol; esters of tetrahydric alcohol and aliphatic carboxylic acid, such as pentaerythritol tetrastearate and pentaerythritol tetrapalmitate, or esters of tetrahydric carboxylic acid and aliphatic alcohol; esters of hexahydric alcohol and aliphatic carboxylic acid, such as dipentaerythritol hexastearate and dipentaerythritol palmitate, or esters of hexahydric carboxylic acid and aliphatic alcohol; esters of polyhydric alcohol and aliphatic carboxylic acid, such as polyglycerin behenate, or esters of polyhydric carboxylic acid and aliphatic alcohol; and natural ester waxes such as carnauba wax and rice wax. These may be used alone or in combination.

Colorant

The toner particles may contain a colorant. A known pigment or a known dye can be used as the colorant. From the viewpoint of excellent weather resistance, a pigment is suitable as the colorant.

Examples of a cyan-based colorant include a copper phthalocyanine compound and a derivative thereof, an anthraquinone compound, and a base dye lake compound. Specific examples thereof include C.I. Pigment Blue 1, 7, 15, 15:1, 15:2, 15:3, 15:4, 60, 62, and 66.

Examples of a magenta-based colorant include a condensed azo compound, a diketopyrrolopyrrole compound, an anthraquinone compound, a quinacridone compound, a base dye lake compound, a naphthol compound, a benzimidazolone compound, a thioindigo compound, and a perylene compound. Specific examples thereof include C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254, and C.I. Pigment Violet 19.

Examples of a yellow-based colorant include a condensed azo compound, an isoindolinone compound, an anthraquinone compound, an azo metal complex, a methine compound, and an allylamide compound. Specific examples thereof include C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of a black colorant include colorants toned to black using the yellow-based colorant, the magenta-based colorants, and the cyan-based colorants described above, and carbon black.

These colorants can be used alone or in the form of a mixture, and can also be used as a solid solution.

The content of the colorant is, for example, 1.0 parts by mass or greater and 20.0 parts by mass or less with respect to 100.00 parts by mass of the binder resin. Charge control agent and charge control resin The toner particles may contain a charge control agent or a charge control resin.

As the charge control agent, a known charge control agent can be used, and particularly a charge control agent that has a high triboelectric charging speed and is capable of stably maintaining a constant triboelectric charging amount is suitable. Further, in a case where the toner particles are produced by a suspension polymerization method, a charge control agent that has low polymerization inhibition properties and is substantially free from a solubilized substance in an aqueous medium is particularly suitable.

Examples of a charge control agent that controls the toner to be negatively charged include a monoazo metal compound, an acetylacetone metal compound, an aromatic oxycarboxylic acid-based metal compound, an aromatic dicarboxylic acid-based metal compound, an oxycarboxylic acid-based metal compound, a dicarboxylic acid-based metal compound, an aromatic oxycarboxylic acid, an aromatic monocarboxylic acid, an aromatic polycarboxylic acid, and metal salts thereof, anhydrides, esters, phenol derivatives such as bisphenol, urea derivatives, a metal-containing salicylic acid-based compound, a metal-containing naphthoic acid-based compound, a boron compound, a quaternary ammonium salt, a calixarene, an a charge control resin.

Examples of the charge control resin include a polymer or copolymer containing a sulfonic acid group, a sulfonate group, or a sulfonic acid ester group. The polymer containing a sulfonic acid group, a sulfonate group, or a sulfonic acid ester group is, for example a polymer containing 2% by mass or greater of a sulfonic acid group-containing acrylamide-based monomer or a sulfonic acid group-containing methacrylamide-based monomer and, for example, a polymer containing 5% by mass or greater thereof in terms of the copolymerization ratio.

The charge control resin may have a glass transition temperature (Tg) of 35° C. or higher and 90° C. or lower, a peak molecular weight (Mp) of 10000 or greater and 30000 or less, and a weight-average molecular weight (Mw) of 25000 or greater and 50000 or less. In a case where such a charge control resin is used, preferred triboelectric charge characteristics can be imparted to the toner particles without affecting thermal characteristics required for the toner particles. Further, in a case where the charge control resin contains a sulfonic acid group, for example, the dispersibility of the charge control resin and the dispersibility of a colorant and the like in a polymerizable monomer composition are improved, and the coloring power, the transparency, and the triboelectric charge characteristics can be improved.

These charge control agents or charge control resins may be respectively used alone or in combination of two or more kinds thereof for addition.

The amount of the charge control agent or charge control resin to be added is, for example, 0.01 parts by mass or greater and 20.0 parts by mass or less and, for example, 0.5 parts by mass or greater and 10.0 parts by mass or less with respect to 100.0 parts by mass of the binder resin.

Method of Producing Toner

A method of producing the toner is not particularly limited, and the toner can be produced by using a known method such as a pulverization method, a suspension polymerization method, a dissolution suspension method, an emulsion aggregation method, or a dispersion polymerization method. Here, the toner can be produced by the method described below. That is, the toner can be produced by an emulsion aggregation method.

The method of producing the toner includes steps (1) to (3) in the following order: (1) a dispersion step of preparing a binder resin fine particle dispersion liquid containing the binder resin, (2) an aggregation step of aggregating binder resin fine particles contained in the binder resin fine particle dispersion liquid to form aggregates, and (3) a fusion step of heating and fusing the aggregates, in which a boric acid source is added in at least one of the aggregation step and the fusing step.

Further, in the middle or after the fusion step, steps (4) to (6) can be provided in the following order: (4) a spheronization step of increasing the temperature and heating the aggregates, (5) a cooling step of cooling the aggregates at a cooling rate of 0.1° C./sec or greater, and (6) an annealing step of heating and holding the aggregates at a temperature higher than or equal to the crystallization temperature of the binder resin or higher than or equal to the glass transition temperature of the binder resin.

The toner can be produced by an emulsion aggregation method from the viewpoint of controlling the toner shape.

Hereinafter, the emulsion aggregation method will be described in detail.

Emulsion Aggregation Method

The emulsion aggregation method is a method of producing toner particles by preliminarily preparing an aqueous dispersion liquid of fine particles formed of a constituent material of toner particles which are relatively small with respect to the target particle diameter, aggregating the fine particles until the particle diameter of the particles reach the particle diameter of the toner particles in an aqueous medium, and fusing the resin by being heated or the like.

That is, according to the emulsion aggregation method, the toner particles are produced by performing a dispersion step of preparing a fine particle dispersion liquid formed of a constituent material of toner particles, an aggregation step of controlling the particle diameter until the particle diameter of the particles reaches the particle diameter of the toner particles, a fusion step of performing melt adhesion on the resin contained in the obtained aggregated particles, a spheronization step of heating the particles so that the particles are melted and controlling the surface shape of the toner, a subsequent cooling step, a metal removal step of separating the obtained toner by filtration and removing an excess amount of polyvalent metal ions, a filtration and washing step of washing the toner with ion exchange water or the like, and a step of removing the moisture of the washed toner particles and drying the toner particles.

Step of Preparing Resin Fine Particle Dispersion Liquid (Dispersion Step)

The resin fine particle dispersion liquid can be prepared by a known method, but the present disclosure is not limited thereto. Examples of the known method include an emulsion polymerization method, a self-emulsification method, a phase inversion emulsification method of adding an aqueous medium to a resin solution dissolved in an organic solvent to emulsify the resin, and a forced emulsification method of performing a high-temperature treatment in an aqueous medium to forcibly emulsify the resin without using an organic solvent.

Specifically, the binder resin is dissolved in an organic solvent that can dissolve the resin, and a surfactant and a basic compound are added thereto. In this case, when the binder resin is a crystalline resin having a melting point, the resin may be dissolved by being heated at the melting point or higher. Next, an aqueous medium is slowly added to the mixture while the mixture is stirred with a homogenizer or the like, to precipitate the resin fine particles. Thereafter, the solvent is removed by heating the mixture or reducing the pressure, thereby preparing an aqueous dispersion liquid of the resin fine particles. Any organic solvent can be used as the organic solvent used for dissolving the resin as long as the organic solvent can dissolve the resin, but an organic solvent that forms a homogeneous phase with water, such as toluene, can be used from the viewpoint of suppressing generation of coarse powder.

The surfactant used for the emulsification is not particularly limited, and examples thereof include an anionic surfactant such as a sulfuric acid ester salt-based surfactant, a sulfonate-based surfactant, a carbonate-based surfactant, a phosphoric acid ester-based surfactant, or a soap-based surfactant; a cationic surfactant such as an amine salt type surfactant or a quaternary ammonium salt type surfactant; and a nonionic surfactant such as a polyethylene glycol-based surfactant, an alkylphenol ethylene oxide adduct-based surfactant, or a polyhydric alcohol-based surfactant. The surfactant may be used alone or in combination of two or more kinds thereof.

Examples of the basic compound used in the dispersion step include an inorganic base such as sodium hydroxide or potassium hydroxide; and an organic base such as ammonia, triethylamine, trimethylamine, dimethylaminoethanol, or diethylaminoethanol. The basic compound may be used alone or in combination of two or more kinds thereof.

Further, the 50% particle diameter (D50) of fine particles of the binder resin based on volume distribution in the aqueous dispersion liquid of resin fine particles is, for example, in a range of 0.05 μm to 1.0 μm and, for example, in a range of 0.05 μm to 0.4 μm. Toner particles having an appropriate volume average particle diameter of 3 μm to 10 μm are easily obtained by adjusting the 50% particle diameter (D50) thereof based on volume distribution to be in the above-described ranges.

In addition, the 50% particle diameter (D50) of particles based on volume distribution is measured using a dynamic light scattering particle size distribution meter NANOTRAC UPA-EX150 (manufactured by Nikkiso Co., Ltd.).

Colorant Fine Particle Dispersion Liquid

A colorant fine particle distribution liquid may be used as necessary. The colorant fine particle distribution liquid can be prepared by a known method described below, but the present disclosure is not limited thereto. The colorant fine particle distribution liquid can be prepared by mixing a colorant, an aqueous medium, and a dispersant using a known mixer such as a stirrer, an emulsifier, or a disperser. A known dispersant such as a surfactant or a polymer dispersant can be used as the dispersant used here. Both dispersants, the surfactant and the polymer dispersant, can be removed in a washing step described below, but the surfactant is suitable from the viewpoint of washing efficiency.

Examples of the surfactant include an anionic surfactant such as a sulfuric acid ester salt-based surfactant, a sulfonate-based surfactant, a phosphoric acid ester-based surfactant, or a soap-based surfactant; a cationic surfactant such as an amine salt type surfactant or a quaternary ammonium salt type surfactant; and a nonionic surfactant such as a polyethylene glycol-based surfactant, an alkylphenol ethylene oxide adduct-based surfactant, or a polyhydric alcohol-based surfactant. Among these, a nonionic surfactant or an anionic surfactant is suitable. Further, a nonionic surfactant and an anionic surfactant may be used in combination. The surfactant may be used alone or in combination of two or more kinds thereof. The concentration of the surfactant in an aqueous medium is, for example, in a range of 0.5% by mass to 5% by mass.

The content of the colorant fine particles in the colorant fine particle dispersion liquid is not particularly limited, but is, for example, in a range of 1% by mass to 30% by mass with respect to the total mass of the colorant fine particle dispersion liquid.

In the dispersed particle diameter of the colorant fine particle in the aqueous dispersion liquid of the colorant, the 50% particle diameter (D50) based on the volume distribution is, for example, 0.5 μm or less from the viewpoint of the dispersibility of the colorant in the toner to be finally obtained. Further, a 90% particle diameter (D90) based on the volume distribution is, for example, 2 μm or less for the same reason. In addition, the dispersed particle diameter of the colorant fine particles dispersed in the aqueous medium is measured using a dynamic light scattering particle size distribution meter (NANOTRAC UPA-EX150, manufactured by Nikkiso Co., Ltd.).

Examples of the mixer such as a known stirrer, emulsifier, or disperser used when the colorant is dispersed in the aqueous medium include an ultrasonic homogenizer, a jet mill, a pressure homogenizer, a colloid mill, a ball mill, a sand mill, and a paint shaker. These may be used alone or in combination.

Release Agent (Aliphatic Hydrocarbon Compound) Fine Particle Dispersion Liquid

A release agent fine particle dispersion liquid may be used as necessary. The release agent fine particle dispersion liquid can be prepared by a known method described below, but the present disclosure is not limited thereto.

The release agent fine particle dispersion liquid can be prepared by adding a release agent to an aqueous medium containing a surfactant, heating the mixture at a temperature higher than or equal to the melting point of the release agent, dispersing the release agent in the form of particles using a homogenizer (for example, "CLEARMIX W-MOTION", manufactured by M Technique Co., Ltd.) having a strong shearing ability or a pressure ejection type disperser (for example, "GAULIN HOMOGENIZER", manufactured by Gaulin Corporation), and cooling the mixture at a temperature lower than the melting point of the release agent.

In the dispersed particle diameter of the release agent fine particle dispersion liquid in the aqueous dispersion liquid of the release agent, the 50% particle diameter (D50) based on the volume distribution is, for example, in a range of 0.03 μm to 1.0 μm and, for example, in a range of 0.1 μm to 0.5 μm. Further, no coarse particles having a particle diameter of 1 μm or greater may be present.

In a case where the dispersed particle diameter of the release agent fine particle dispersion liquid is in the above-described ranges, the release agent can be present in a state of being finely dispersed in the toner, a bleeding effect during fixation can be maximized, and satisfactory separation properties can be obtained. Further, the dispersed particle diameter of the release agent fine particle dispersion liquid dispersed in the aqueous medium can be measured using a dynamic light scattering particle size distribution meter NANOTRAC UPA-EX150 (manufactured by Nikkiso Co., Ltd.).

Mixing Step

In the mixing step, a mixed solution is prepared by mixing the resin fine particle dispersion liquid with at least one of the release agent fine particle dispersion liquid and the colorant fine particle dispersion liquid as necessary. The mixed solution can be prepared by using a known mixing device such as a homogenizer or a mixer.

Step of Forming Aggregate Particles (Aggregation Step)

In the aggregation step, the fine particles contained in the mixed solution prepared in the mixing step are aggregated to form aggregates with a target particle diameter. Here, an aggregating agent is added thereto and mixed into the mixture, and the mixture is appropriately subjected to heating and mechanical power as necessary to form aggregates in which the resin fine particles and at least one of the release agent fine particles and the colorant fine particles are aggregated.

Examples of the aggregating agent include an organic aggregating agent such as a quaternary salt cationic surfactant or polyethyleneimine; an inorganic metal salt such as sodium sulfate, sodium nitrate, sodium chloride, calcium chloride, or calcium nitrate; an inorganic ammonium salt such as ammonium sulfate, ammonium chloride, or ammonium nitrate; and an inorganic aggregating agent such as a di- or higher valent metal complex. Further, an acid can also be added to the mixed solution so that the pH is decreased and the particles are softly aggregated, and sulfuric acid, nitric acid, or the like can be used as the acid.

The aggregating agent may be added to the mixed solution in any form of dry powder or an aqueous solution dissolved in an aqueous medium, but the aggregating agent can be added in the form of an aqueous solution in order to uniformly aggregate the particles. Further, the aggregating agent can be added to and mixed into the mixed solution at a temperature lower than or equal to the glass transition temperature or the melting point of the resin contained in the mixed solution. When the aggregating agent is mixed into the mixed solution under the above-described temperature conditions, relatively uniform aggregation proceeds. The aggregating agent can be mixed into the mixed solution using a known mixing device such as a homogenizer or a mixer. The aggregation step is a step of forming aggregates having a toner particle size in the aqueous medium. The volume average particle diameter of the aggregates produced in the aggregation step is, for example, in a range of 3 μm to 10 μm. The volume average particle diameter can be measured by a coulter method using a particle size distribution analyzer (COULTER Multisizer III: manufactured by Beckman Coulter, Inc.).

Step of Obtaining Dispersion Liquid Containing Toner Particles (Fusion Step)

In the fusion step, first, the aggregation is stopped while the dispersion liquid containing the aggregates obtained in the aggregation step is stirred in the same manner as in the aggregation step. The aggregation is stopped by adding an aggregation stopping agent such as a base, a chelate compound, or an inorganic salt compound such as sodium chloride, which can adjust the pH.

The dispersed state of the aggregated particles in the dispersion liquid is stabilized by the action of the aggregation stopping agent, the mixed solution is heated at a temperature higher than or equal to the glass transition temperature or the melting point of the binder resin to fuse the aggregated particles, and thus the particles having a desired particle diameter are prepared.

Further, the 50% particle diameter (D50) based on volume distribution of the toner particles is, for example, in a range of 3 μm to 10 μm.

Step of Obtaining Desired Surface Shape of Toner (Spheronization Step)

The spheronization step of further increasing the temperature and maintaining the temperature until the toner particles have a desired circularity or surface shape can be performed during or after the fusion step. The specific temperature of the spheronization step is, for example, 90° C. or higher, for example, 92° C. or higher, and, for example, 95° C. or lower. The heating time in the spheronization step is, for example, 3 hours or longer, 5 hours or longer, or 8 hours or longer. In the present step, a hydrogen bond derived from boric acid is likely to be formed in the toner particles.

Cooling Step

The cooling step of decreasing the temperature of the dispersion liquid containing the obtained toner particles to a temperature lower than the crystallization temperature or the glass transition temperature of the binder resin can be performed by controlling the cooling rate after the spheronization step. When the cooling step is performed, formation of unevenness on the surface of the toner particles accompanied by a change in volume, such as expansion or contraction of the material in the toner particles is suppressed. The specific cooling rate is 0.1° C./sec or greater, for example, 0.5° C./sec or greater, for example, 2° C./sec or greater, and, for example, 4° C./sec or greater.

Annealing Step

An annealing step of heating the mixed solution at a temperature higher than or equal to the crystallization temperature or higher than or equal to the glass transition temperature of the binder resin or at a temperature lower than or equal to the crystallization temperature of a release agent in a case where the mixed solution contains a release agent and maintaining the temperature can be performed after the cooling step. When the annealing step is performed, since the change in volume can be further suppressed, occurrence of recesses on the surface of the toner particles can be further suppressed. Therefore, the desired circularity or the desired surface shape obtained by performing the cooling step can be maintained. The specific annealing temperature is 45° C. or higher and 75° C. or lower, for example, 50° C. or higher and 70° C. or lower, and for example, 55° C. or higher and 65° C. or lower. The heat treatment time in the annealing step is, for example, 5 hours or shorter and, for example, in a range of 2 to 3 hours.

Post-Treatment Step

In the method of producing the toner, post-treatment steps such as a washing step, a solid-liquid separation step, a drying step, and the like may be performed, and toner particles in a dried state can be obtained by performing the post-treatment steps.

External Addition Step

The obtained toner particles can be used as a toner by appropriately adding external additive particles thereto.

In the external addition step, inorganic fine particles are subjected to an external addition treatment to the toner particles obtained in the drying step.

Specifically, inorganic fine particles such as silica and resin fine particles such as a vinyl-based resin, a polyester resin, and a silicone resin can be added to and mixed with the above-described external additive A by applying a shearing force in a dry state. A known external adder can be used as an external adder that performs the external addition step.

The sticking state of the external additive and the coating state of the toner particles with the external additive can be arbitrarily controlled by adjusting the rotation speed (rpm) of the stirring blade provided in an external adder and the external addition time as external addition conditions.

It is effective to increase the rotation speed and the external addition time in order to more firmly stick the toner particles, and particularly the sticking strength can be further increased by increasing the rotation speed. Further, since external additive particles with a small particle diameter form aggregates, the toner particles are subjected to a coating treatment with an external additive while a disintegration treatment is carried out by controlling the external addition conditions. The disintegration properties can be enhanced by increasing the rotation speed and the external addition time, but it is effective to reduce the rotation speed and to increase the external addition time in order to further promote disintegration while suppressing the sticking strength.

In the method of producing the toner, a shell formation step of forming a shell by further adding resin fine particles containing a resin for a shell and aggregating the particles can be provided after the formation of aggregated particles (core particles) in the aggregation step. That is, the toner particles may include core particles containing a binder resin and a shell on the core particle surface. As the resin for a shell, the same resin as the binder resin may be used, or other resins may be used. The amount of the resin for a shell to be added is, for example, 5 parts by mass or greater and 40 parts by mass or less and, for example, 10 parts by mass or greater and 30 parts by mass or less with respect to 100 parts by mass of the binder resin contained in the core particles.

In this case, the method of producing the toner may include the following steps: (1) a dispersion step of preparing a binder resin fine particle dispersion liquid containing the binder resin, (2) an aggregation step of aggregating binder resin fine particles contained in the binder resin fine particle dispersion liquid to form aggregates, and (3) a fusion step of heating and fusing the aggregates.

That is, the above-described aggregation step (2) (aggregation step of aggregating binder resin fine particles contained in the binder resin fine particle dispersion liquid to form aggregates) may include the following steps (2-1) and (2-2): (2-1) an aggregation step of aggregating binder resin fine particles contained in the binder resin fine particle dispersion liquid to form aggregates, and (2-2) a shell formation step of further adding resin fine particles containing a resin for a shell to the dispersion liquid containing aggregates and aggregating particles to form aggregates having a shell.

Further, in the middle or after the fusion step, steps (4) to (6) can be provided in the following order: (4) a spheronization step of increasing the temperature and heating the aggregates, (5) a cooling step of cooling the aggregates at a cooling rate of 0.1° C./sec or greater, and (6) an annealing step of heating and holding the aggregates at a temperature higher than or equal to the crystallization temperature of the resin or higher than or equal to the glass transition temperature of the binder resin.

In order to allow the toner particles to easily contain boron atoms, a boron source can be added to the dispersion liquid containing the aggregates along with the resin fine particles containing the resin for a shell in the shell formation step.

Examples of the boron source include at least one selected from the group consisting of boric acid, borax, organic boric acid, a borate, boric acid ester, and the like. For example, the pH may be controlled by adding the boron source to the mixed solution so that the aggregates contain boron. The shell formation step can be performed by controlling the pH to be under an acidic condition in the aggregation step.

At least one selected from the group consisting of boric acid and borax is suitable as the boron source. In a case where the toner is produced in an aqueous medium, a borate can be added to the mixed solution as the boron source from the viewpoints of the reactivity and the production stability. Specifically, the boron source may include at least one selected from the group consisting of sodium tetraborate, borax, and ammonium borate and particularly borax.

Borax is represented by a sodium tetraborate decahydrate ($Na_2B_4O_7$), and changed to boric acid in an acidic aqueous solution, and thus borax is, for example, used in a case of being used in an aqueous medium in an acidic environment. According to an addition method, borax may be added in any form of dry powder or an aqueous solution dissolved in an aqueous medium, but borax can be added in the form of an aqueous solution in order to uniformly aggregate the particles. The concentration of the aqueous solution may be appropriately changed depending on the concentration thereof to be contained in the toner, and is, for example, in a range of 1% to 20% by mass. The pH can be controlled to be under an acidic condition before, during, or after the addition of borax in order to change borax to boric acid. The pH may be controlled to be, for example, in a range of 1.5 to 5.0 and, for example, in a range of 2.0 to 4.0.

Method of Measuring Each Physical Property

Next, a method of measuring each physical property according to the present disclosure will be described.

Measurement of Weight-Average Particle Diameter (D4) and Number Average Particle Diameter (D1) of Toner or Toner Particles The weight-average particle diameter (D4) and the number average particle diameter (D1) of the toner or toner particles are measured by 25000 effective measuring channels using a precision particle size distribution measuring device "COULTER COUNTER Multisizer 3" (registered trademark, manufactured by Beckman Coulter, Inc.) provided with an aperture tube having a diameter of 100 μm by an aperture impedance method and dedicated software "BECKMAN COULTER Multisizer 3 Version 3.51" (manufactured by Beckman Coulter, Inc.) attached to the device and calculated by analyzing measurement data.

An electrolyte solution obtained by dissolving special grade sodium chloride in ion exchange water and adjusting the concentration thereof to about 1% by mass, for example, "ISOTON II" (manufactured by Beckman Coulter, Inc.) can be used as the electrolyte solution used for the measurement.

In addition, the dedicated software is set up in the following manner before the measurement and the analysis.

In the dedicated software "screen for changing standard measuring method (SOM)", the total count number in the control mode is set to 50000 particles, the number of times of measurement is set to once, and a value obtained by using "nominal particle 10.0 μm" (manufactured by Beckman Coulter, Inc.) is set as the Kd value. The threshold value and the noise level are automatically set by pressing the measurement button of the threshold value/noise level. Further, the current is set to 1600 μA, the gain is set to 2, the electrolyte solution is set to ISOTON II, and the aperture tube flash after measurement is checked.

In dedicated software "setting screen for converting pulse to particle diameter", the bin interval is set to the logarithmic particle diameter, the particle diameter bin is set to 256 particle diameter bin, and the particle diameter range is set to 2 μm or greater and 60 μm or less.

The specific measuring method is as follows.

(1) A 250 ml round-bottom glass beaker for exclusive use of Multisizer 3 is charged with about 200 ml of the electrolyte solution and set on a sample stand, and the solution is stirred with a stirrer rod at 24 rotations/sec in a counterclockwise direction. Further, the stain and air bubbles inside the aperture tube are removed by the dedicated software "aperture tube flash".

(2) A 100 ml flat-bottom glass beaker is charged with about 30 ml of the electrolyte solution, and about 0.3 ml of a diluent obtained by diluting "Contaminon N" (10 mass % aqueous solution of neutral detergent for washing precision measuring machine with pH of 7, which is formed of nonionic surfactant, anionic surfactant, and organic builder, manufactured by Wako Pure Chemical Industries, Ltd.) to 3 times by mass with ion exchange water is added thereto as a dispersant.

(3) A predetermined amount of ion exchange water is poured into a water tank of an ultrasonic disperser "Ultrasonic Dispersion System Tetoral 150" with an electrical output of 120 W, which is provided with two built-in oscillators having an oscillation frequency of 50 kHz in a state of a phase shift of 180 degrees, and about 2 ml of Contaminon N is added to the water tank.

(4) The beaker of the item (2) is set in a beaker fixing hole of the ultrasonic disperser, and the ultrasonic disperser is operated. Further, the position of the height of the beaker is adjusted such that the resonance state of the liquid level of the electrolyte solution in the beaker is maximized.

(5) The electrolyte solution in the beaker of the item (4) is irradiated with ultrasonic waves, and about 10 mg of the toner or the toner particles are added to the electrolyte solution little by little and dispersed therein. Further, an ultrasonic dispersion treatment is further continued for 60 seconds. In addition, the water temperature in the water tank is appropriately adjusted to 10° C. or higher and 40° C. or lower in the ultrasonic dispersion treatment.

(6) The electrolyte solution of the item (5) in which the toner or the toner particles have been dispersed using a pipette is added dropwise to the round-bottom beaker of the item (1) disposed in the sample stand, and the measurement concentration is adjusted to about 5%. Further, the measurement is performed until the number of measured particles reaches 50000.

(7) The weight-average particle diameter (D4) is calculated by analyzing the measurement data using the dedicated software attached to a device. Further, "average diameter" of the analysis/volume statistics (arithmetic average) screen is the weight-average particle diameter (D4) in a case where the graph/vol % is set with the dedicated software, and "average diameter" of "analysis/number statistics (arithmetic average)" screen is the number average particle diameter (D1) in a case where the graph/number % is set with the dedicated software.

Method of Measuring Average Circularity of Toner (Particles)

The average circularity of the toner or the toner particles is measured using a flow type particle image analyzer "FPIA-3000" (manufactured by Sysmex Corporation) under measurement and analysis conditions during the calibration work.

An appropriate amount of alkylbenzene sulfonate serving as a surfactant is added to 20 mL of ion exchange water as a dispersant, 0.02 g of a measurement sample is added thereto, and a dispersion treatment is performed on the mixture for 2 minutes using a table top ultrasonic cleaner disperser (trade name: VS-150, manufactured by VELVO-CLEAR) at an oscillation frequency of 50 kHz and an electrical output of 150 watts to obtain a dispersion liquid for measurement. In this case, the dispersion liquid is appropriately cooled such that the temperature of the dispersion liquid is 10° C. or higher and 40° C. or lower.

The measurement is performed by using the flow type particle image analyzer equipped with a high-magnification objective lens (20 times) and a particle sheath "PSE-900A"

(manufactured by Sysmex Corporation) as a sheath liquid. The dispersion liquid prepared by the above-described procedures is introduced to the flow type particle image analyzer, 3000 particles are measured in a total count mode and an HPF measurement mode, and the binarization threshold value during particle analysis is set to 85%. Further, the particle diameter for analysis is limited to an equivalent circle diameter of 1.98 μm or greater and 19.92 μm or less. The external additive separated from the surface of the toner particles during the preparation of the dispersion liquid can be excluded from the measurement results by limiting the particle diameter.

The average circularity and the proportion (the deformation ratio or deformed toner ratio) of particles having a circularity of 0.900 or greater and 0.930 or less are calculated from the obtained analysis results.

In the measurement, automatic focus adjustment is performed using standard latex particles (for example, 5100A (trade name, manufactured by Duke Scientific Corporation) diluted with ion exchange water) before the start of measurement. Thereafter, focus adjustment can be performed every two hours from the start of measurement.

Method of Measuring Major Axis and Aspect Ratio of External Additive A

The major axis and the aspect ratio of the external additive A are measured by using a scanning electron microscope (for example, scanning electron microscope "S-4800" (trade name, manufactured by Hitachi, Ltd.). The toner to which the external additive A has been added is observed in a visual field magnified up to 50000 times, and the major axis and the minor axis of 100 random primary particles of the external additive A are measured. Here, the aspect ratio of the external additive A is calculated by the following equation. The observation magnification is appropriately adjusted according to the size of the external additive A.

Aspect ratio of external additive A=major axis of external additive A=minor axis of external additive A Method of measuring proportion of toner particles having surface where external additive A can be confirmed to be present The proportion of the toner particles having a surface where the external additive A can be confirmed to be present is measured by using a scanning electron microscope (for example, scanning electron microscope "S-4800" (trade name, manufactured by Hitachi, Ltd.).

In a visual field magnified to about 3000 times such that 10 to 30 toner particles can be observed in one visual field, 50 random toner particles to which the external additive A has been added are observed. Among the 50 toner particles, the proportion which is the number of toner particles having a surface where one or more of external additives A are present is calculated and defined as the proportion of the toner particles having a surface where the external additive A can be confirmed to be present. The observation magnification is appropriately adjusted according to the size of the toner and the size of the external additive A.

Measurement of Content of Boron in Toner Particles

Method of Removing External Additive from Toner to Obtain Toner Particles 160 g of sucrose (manufactured by Kishida Chemical Co., Ltd.) is added to 100 mL of ion exchange water and dissolved in a hot water bath, thereby preparing a concentrated sucrose solution. 31 g of the concentrated sucrose solution and 6 mL of Contaminon N (10 mass % aqueous solution of neutral detergent for washing precision measuring machine with pH of 7, which is formed of nonionic surfactant, anionic surfactant, and organic builder, manufactured by Wako Pure Chemical Industries, Ltd.) are poured into a centrifuge tube (volume of 50 ml). 1.0 g of the toner is added thereto, and the toner clumps are broken up with a spatula or the like. The centrifuge tube is shaken in a shaker (AS-IN, sold by AS ONE CORPORATION) at 300 spm (strokes per min) for 20 minutes.

After the centrifuge tube is shaken, the solution is transferred to a glass tube (50 mL) for a swing rotor and separated by a centrifuge (H-9R, manufactured by KOKUSAN Co., Ltd.) at 3500 rpm for 30 minutes.

The toner particles and the external additive are separated from each other by performing this operation. The toner particles separated into the uppermost layer are collected by a spatula or the like after visual confirming that the toner particles are sufficiently separated from the aqueous solution. The collected toner particles are filtered through a vacuum filter and dried by a dryer for 1 hour or longer, thereby obtaining a sample for measurement. This operation is performed a plurality of times to ensure the required amount.

Content of Boron in Toner Particles (ICP-AES)

The content of boron in the toner particles is quantified by an inductively coupled plasma atomic emission spectrometer (ICP-AES manufactured by Seiko Instruments Inc.).

As the pretreatment, 100.0 mg of the toner particles are subjected to acid decomposition by using 8.00 ml of 60% nitric acid (for atomic absorption spectrometry, manufactured by KANTO CHEMICAL CO., INC.). During the acid decomposition, the treatment is performed in a sealed container at an internal temperature of 220° C. for 1 hour using a microwave high-power sample pretreatment device ETHOS1600 (manufactured by Milestone General K.K.) to prepare a boron-containing solution sample. Thereafter, pure water is added thereto such that the total amount thereof reaches 50.00 g to obtain a measurement sample. A calibration curve is created, the amount of boron contained in each sample is quantified. Further, a blank obtained by adding pure water to 8.00 ml of nitric acid and adjusting the total amount thereof to 50.00 g is measured, and the amount of boron of the blank is subtracted from the amount of boron obtained above.

EXAMPLES

Hereinafter, the present disclosure will be described in more detail with reference to examples and comparative examples. The present disclosure is not limited to the following examples unless the gist thereof is overstepped. In the description of the following examples, "parts" are on a mass basis unless otherwise specified.

Synthesis of polyester resin 1

Bisphenol A-ethylene oxide 2-mole adduct: 48 parts by mole

Bisphenol A-propylene oxide 2-mole adduct: 48 parts by mole

Terephthalic acid: 65 parts by mole

Dodecenylsuccinic acid: 30 parts by mole

A flask provided with a stirring device, a nitrogen introduction pipe, a temperature sensor, and a rectifying tower was charged with the above-described monomers and heated to 195° C. for 1 hour, and it was confirmed that the mixture in the reaction system was uniformly stirred.

0.7 parts of tin distearate was added thereto with respect to 100 parts of these monomers. The temperature was increased from 195° C. to 240° C. over 5 hours while water which was further generated was distilled off, and a dehydration condensation reaction was further carried out at 240°

C. for 2 hours. Next, the temperature was decreased to 190° C., 5 parts by mole of trimellitic anhydride was gradually added thereto, and the reaction was continued at 190° C. for 1 hour.

As a result, a polyester resin 1 having a glass transition temperature of 55.2° C., an acid value of 14.3 mgKOH/g, a hydroxyl value of 24.1 mgKOH/g, a weight-average molecular weight of 43600, and a number average molecular weight of 6200 was obtained.

Preparation of Resin Particle Dispersion Liquid 1

Polyester resin 1:100 parts

Methyl ethyl ketone: 50 parts

Isopropyl alcohol: 20 parts

The methyl ethyl ketone and the isopropyl alcohol were added to a container. Thereafter, the polyester resin 1 was gradually added thereto, the mixture was stirred for complete dissolution, thereby obtaining a polyester resin 1-dissolved solution. The temperature of the container containing the polyester resin 1-dissolved solution was set to 65° C., a 10% ammonia aqueous solution was gradually added dropwise to the container so that the total amount of the solution reached 5 parts while the mixture was stirred, and 230 parts of ion exchange water was further gradually added dropwise thereto at a rate of 10 ml/min to cause phase inversion emulsification. Further, desolvation was performed under reduced pressure using an evaporator, thereby obtaining a resin particle dispersion liquid 1 of the polyester resin 1. The volume average particle diameter of the resin particles was 135 nm. Further, the solid content of the resin particles was adjusted to 20% with ion exchange water.

Preparation of Colorant Particle Dispersion Liquid

Copper phthalocyanine (Pigment Blue 15:3): 45 parts

Anionic surfactant NEOGEN RK (manufactured by DKS Co., Ltd.): 5 parts

Ion exchange water: 190 parts

An aqueous dispersion liquid (colorant fine particle dispersion liquid) in which the concentration of colorant fine particles was 20% was prepared by mixing the above-described components, dispersing the components using a high-pressure impact type disperser NANOMIZER (manufactured by YOSHIDA KIKAI CO., LTD.) for about 1 hour, and dispersing the colorant.

Preparation of Release Agent Particle Dispersion Liquid 1

Release agent (HNP-51, manufactured by NIPPON SEIRO CO., LTD., melting point of 78° C.): 45 parts Anionic surfactant NEOGEN RK (manufactured by DKS Co., Ltd.): 5 parts Ion exchange water: 190 parts A mixing container equipped with a stirring device was charged with the above-described components, and the mixture was heated to 90° C., circulated through CLEARMIX W-MOTION (manufactured by M Technique Co., Ltd.), and subjected to a dispersion treatment for 60 minutes. The dispersion treatment was performed under the following conditions.

Rotor outer diameter: 3 cm

Clearance: 0.3 mm

Rotor rotation speed: 19000 r/min

Screen rotation speed: 19000 r/min

The mixture was cooled to 40° C. under cooling treatment conditions of a rotor rotation speed of 1000 r/min, a screen rotation speed of 0 r/min, and a cooling rate of 10° C./min after the dispersion treatment, thereby obtaining a release agent particle dispersion liquid 1 having a volume average particle diameter of 160 nm and a solid content of 20%.

Preparation of Release Agent Particle Dispersion Liquid 2

Release agent (behenyl behenate, melting point of 74° C.): 45 parts

Anionic surfactant NEOGEN RK (manufactured by DKS Co., Ltd.): 5 parts

Ion exchange water: 190 parts

A mixing container equipped with a stirring device was charged with the above-described components, and the mixture was heated to 90° C., circulated through CLEARMIX W-MOTION (manufactured by M Technique Co., Ltd.), and subjected to a dispersion treatment for 60 minutes. The dispersion treatment was performed under the following conditions.

Rotor outer diameter: 3 cm

Clearance: 0.3 mm

Rotor rotation speed: 19000 r/min

Screen rotation speed: 19000 r/min

The mixture was cooled to 40° C. under cooling treatment conditions of a rotor rotation speed of 1000 r/min, a screen rotation speed of 0 r/min, and a cooling rate of 10° C./min after the dispersion treatment, thereby obtaining a release agent particle dispersion liquid 2 having a volume average particle diameter of 170 nm and a solid content of 20%.

Production of Toner Suspended Particles 1

Resin particle dispersion liquid 1:700 parts

Colorant particle dispersion liquid 1:80 parts

Release agent particle dispersion liquid 1:30 parts

Release agent particle dispersion liquid 2:90 parts

Ion exchange water: 1000 parts

First, the above-described materials were added to a round stainless steel flask and mixed in a core formation step. Next, the mixture was dispersed using a homogenizer ULTRA-TURRAX T50 (manufactured by IKA) at 5000 r/min for 10 minutes. A 1.0% nitric acid aqueous solution was added thereto to adjust the pH to 3.0, and the mixed solution was heated to 45° C. while the rotation speed at which the mixed solution was stirred in a heating water bath using a stirring blade was appropriately adjusted.

The volume average particle diameter of the formed aggregated particles was appropriately confirmed by using COULTER Multisizer III, and in a case where aggregated particles (cores) having a diameter of 5.0 μm were formed, the following materials were added thereto in a shell formation step and further stirred for 1 hour, thereby forming a shell.

Resin particle dispersion liquid 1:300 parts

Ion exchange water: 300 parts 2.0 mass % borax aqueous solution: 50 parts

Borax: Manufactured by Wako Pure Chemical Industries, Ltd., Sodium Tetraborate Decahydrate Thereafter, the pH of the mixture was adjusted to 9.0 by using a 5% sodium hydroxide aqueous solution, continuously stirred, and heated to 90° C. in the spheronization step.

Thereafter, the average circularity of the formed aggregated particles was appropriately measured by a flow type particle image analyzer "FPIA-3000" (manufactured by Sysmex Corporation).

The aggregated particles were heated (the heating time was 3 hours) until the average circularity thereof reached 0.970. Next, the particles were cooled to 25° C. by quickly adding ice thereto in the cooling step such that the cooling rate was set to 10° C./sec or greater, thereby obtaining toner suspended particles 1.

Production of Toner Suspended Particles 2 to 7

Toner suspended particles 2 to 7 were obtained in the same manner as described above except that the conditions were changed as listed in Tables 1-1 and 1-2 in the production of the toner suspended particles 1.

TABLE 1-1

| | In core formation | | In shell formation | | |
|---|---|---|---|---|---|
| Toner suspended particles No. | Resin particle dispersion liquid | Parts | Particle diameter at start [µm] | Resin particle dispersion liquid | Parts |
| Toner suspended particles 1 | 1 | 700 | 5.0 | 1 | 300 |
| Toner suspended particles 2 | 1 | 700 | 5.0 | 1 | 300 |
| Toner suspended particles 3 | 1 | 700 | 5.0 | 1 | 300 |
| Toner suspended particles 4 | 1 | 700 | 5.0 | 1 | 300 |
| Toner suspended particles 5 | 1 | 700 | 5.0 | 1 | 300 |
| Toner suspended particles 6 | 1 | 700 | 5.0 | 1 | 300 |
| Toner suspended particles 7 | 1 | 700 | 5.0 | 1 | 300 |

TABLE 1-2

| Toner suspended particles No. | Borax aqueous solution [parts] | Magnesium sulfate aqueous solution [parts] | Temperature [° C.] | Time [h] | Average circularity at end of spheronization | Deformation ratio at end of spheronization [number %] |
|---|---|---|---|---|---|---|
| Toner suspended particles 1 | 50 | 0 | 90 | 3 | 0.970 | 4.6 |
| Toner suspended particles 2 | 50 | 0 | 80 | 0.5 | 0.950 | 20.5 |
| Toner suspended particles 3 | 50 | 0 | 90 | 12 | 0.985 | 1.0 |
| Toner suspended particles 4 | 5 | 0 | 90 | 3 | 0.965 | 8.2 |
| Toner suspended particles 5 | 0 | 50 | 90 | 3 | 0.965 | 12.0 |
| Toner suspended particles 6 | 200 | 0 | 90 | 3 | 0.970 | 3.8 |
| Toner suspended particles 7 | 300 | 0 | 90 | 3 | 0.972 | 2.8 |

Production of Toner Particles 1

100 parts of the toner suspended particles 1 were filtered, subjected to solid-liquid separation, and washed with ion exchange water.

100 parts of the toner suspended particles were washed by performing filtration washing 20 times using 200 parts of ion exchange water. After completion of the washing, the toner suspended particles were dried using a vacuum dryer, thereby obtaining toner particles 1 having a weight-average particle diameter (D4) of 6.7 µm. The physical properties of the obtained toner particles 1 are listed in Table 2.

Production of Toner Particles 2

Toner particles 2 were obtained in the same manner as that for the toner suspended particles 1 after 80 parts of the toner suspended particles 2 and 20 parts of the toner suspended particles 3 were mixed. The physical properties of the obtained toner particles 2 are listed in Table 2.

Production of Toner Particles 3

Toner particles 3 were obtained in the same manner as that for the toner suspended particles 1 after 80 parts of the toner suspended particles 3 and 20 parts of the toner suspended particles 1 were mixed. The physical properties of the obtained toner particles 3 are listed in Table 2.

Production of Toner Particles 4 to 8

Toner particles 4 to 8 were obtained in the same manner as described above except that the conditions were changed as listed in Table 2 in the production of the toner particles 1.

TABLE 2

| Toner | Formulation | | | | Physical properties | |
|---|---|---|---|---|---|---|
| particles No. | Toner suspended particles | Parts | Toner suspended particles | Parts | Toner particle diameter [µm] | Boron atoms [mass ppm] |
| Toner particles 1 | 1 | 100 | — | — | 6.7 | 5.0 |

TABLE 2-continued

| Toner particles No. | Formulation: Toner suspended particles | Parts | Toner suspended particles | Parts | Physical properties: Toner particle diameter [μm] | Boron atoms [mass ppm] |
|---|---|---|---|---|---|---|
| Toner particles 2 | 2 | 80 | 3 | 20 | 6.7 | 5.0 |
| Toner particles 3 | 3 | 80 | 1 | 20 | 6.7 | 5.0 |
| Toner particles 4 | 4 | 100 | — | — | 6.7 | 1.0 |
| Toner particles 5 | 5 | 100 | — | — | 6.7 | 0.0 |
| Toner particles 6 | 6 | 100 | — | — | 6.7 | 100.0 |
| Toner particles 7 | 7 | 100 | — | — | 6.7 | 200.0 |
| Toner particles 8 | 2 | 100 | — | — | 6.7 | 5.0 |

Production Example of External Additive 1

A 50% NaOH aqueous solution was added to metatitanic acid obtained by a sulfuric acid method in an amount of 4 times the molar amount of $TiO_2$ as NaOH, and the mixture was heated at 95° C. for 2 hours. The mixture was sufficiently washed, 31% HCl was added thereto such that "HCV/$TiO_2$=0.26" was satisfied, and the mixture was heated at the boiling point for 1 hour. After the mixture was cooled, the mixture was neutralized to a pH of 7 with IN NaOH, washed, and dried, thereby producing rutile type titanium oxide fine particles. The obtained rutile type titanium oxide fine particles had a specific surface area of 115 g/m$^2$.

100 parts of NaCl and 25 parts of $Na_2P_2O_7\cdot 10H_2O$ were added to 100 parts of the rutile type titanium oxide fine particles, mixed using a vibration ball mill for 1 hour, and the mixture was calcined in an electric furnace at 850° C. for 2 hours. The obtained calcined product was added to pure water, heated at 80° C. for 6 hours, and washed to remove soluble salts. All the particles obtained by being dried had a minor axis diameter of 0.03 to 0.07 μm, and needle-like titanium oxide fine particles having a major axis diameter of 0.4 to 0.8 μm were obtained.

100 g of methyltrimethoxysilane, 100 g of trimethoxyfluorosilane, and 5 kg of toluene were used to prepare a slurry, sufficiently mixed into 1000 kg of each base material with a stirrer, and further treated using a horizontal continuous sand grinder mill, and the treated slurry was added to a kneader and dried under reduced pressure, thereby obtaining hydrophobic titanium oxide particles (external additive 1). The physical properties of the obtained external additive 1 are listed in Table 3.

Production Examples of External Additives 2 to 12

External additives 2 to 12 were obtained in the same manner as in the production example of the external additive 1 except that the conditions were changed as listed in Table 3. The physical properties of the obtained external additives 2 to 12 are listed in Table 3.

TABLE 3

| External additive | Substrate Type | Treatment agent: Type | Treatment amount [mass %] | Physical properties: Major axis [nm] | Aspect ratio | Specific resistance [Ω · cm] |
|---|---|---|---|---|---|---|
| 1 | Rutile type titanium oxide | None | — | 800 | 8.0 | $3.0 \times 10^7$ |
| 2 | Rutile type titanium oxide | None | — | 120 | 5.0 | $1.0 \times 10^7$ |
| 3 | Rutile type titanium oxide | None | — | 2860 | 19.1 | $1.0 \times 10^7$ |
| 4 | Rutile type titanium oxide | None | — | 500 | 6.3 | $1.0 \times 10^7$ |
| 5 | Rutile type titanium oxide | None | — | 800 | 4.5 | $1.0 \times 10^7$ |
| 6 | Anatase type titanium oxide | $SnO_2/Sb_2O_3$ | 10 | 800 | 8.0 | $1.0 \times 10^5$ |
| 7 | Rutile type titanium oxide | None | — | 120 | 5.0 | $7.0 \times 10^4$ |
| 8 | Rutile type titanium oxide | $Al(OH)_3$ | 10 | 800 | 8.0 | $1.0 \times 10^8$ |
| 9 | Rutile type titanium oxide | None | — | 120 | 5.0 | $4.0 \times 10^8$ |
| 10 | Aluminum oxide | $SnO_2/Sb_2O_3$ | 20 | 600 | 7.5 | $9.0 \times 10^7$ |
| 11 | Anatase type titanium oxide | None | — | 90 | 4.5 | $1.0 \times 10^7$ |
| 12 | Rutile type titanium oxide | None | — | 5150 | 19.1 | $1.0 \times 10^7$ |

Production Example of External Additive 13

An external additive 13 was silica particles and obtained by performing a hydrophobic treatment on silica particles having a BET specific surface area of 170 $m^2/g$ with hexamethyldisilazane.

Production Example of Toner 1

Toner Particles 1:100.0 Parts

External additive 1 (corresponding to external additive A): 0.60 parts

External additive 13:0.80 parts

The above-described materials were mixed at 3000 rpm for 15 minutes using a Henschel mixer (manufactured by NIPPON COKE & ENGINEERING CO., LTD.), thereby obtaining a toner 1. The proportion of toner particles having a surface where the external additive A was confirmed to be present was 70% by number when the toner was observed using a scanning electron microscope.

Production Examples 2 to 21

Toners 2 to 21 were obtained in the same manner as in Production Example of the toner 1 except that the conditions were changed as listed in Table 4. The proportions of toner particles having a surface where the external additive A was confirmed to be present were as listed in Table 4.

opposite to each other and R was set to 1.3, by changing the gear of the cartridge. Further, the cartridge was filled with 200 g of the toner for evaluation, and the evaluation was performed.

Evaluation of Development Stripes

A durability test was performed by continuously feeding (printing) 10000 sheets of paper of horizontal lines with an image ratio of 1% using the modified evaluation machine and the modified cartridge, and one sheet of a solid black image was printed. The printed solid black image and the developing roller were visually observed to confirm whether development stripes were generated. The evaluation results are listed in Table 5. Evaluation criteria A: Generation of development stripes was not found.

B: Stripes were not generated on the solid black image, but several minor stripes were generated on the developing roller.

C: Three or less of development stripes were generated on the solid black image.

D: Four or more of development stripes were generated on the solid black image.

Evaluation of Ghosts

A durability test was performed by continuously feeding (printing) 10000 sheets of paper of horizontal lines with an image ratio of 1% using the modified evaluation machine

TABLE 4

| Toner | Toner particles | External additive A: External additive | External additive A: Parts | External additives other than external additive A: External additive | External additives other than external additive A: Parts | Proportion of toner particles having surface where external additive A is present Number % | Average circularity | Deformed toner ratio Number % |
|---|---|---|---|---|---|---|---|---|
| 1 | 1 | 1 | 0.6 | 13 | 0.8 | 70 | 0.962 | 12.1 |
| 2 | 2 | 1 | 0.6 | 13 | 0.8 | 70 | 0.955 | 15.0 |
| 3 | 3 | 1 | 0.6 | 13 | 0.8 | 70 | 0.975 | 2.0 |
| 4 | 1 | 2 | 0.6 | 13 | 0.8 | 70 | 0.962 | 12.1 |
| 5 | 1 | 3 | 0.4 | 13 | 0.8 | 45 | 0.962 | 12.1 |
| 6 | 1 | 1 | 0.2 | 13 | 0.8 | 32 | 0.962 | 12.1 |
| 7 | 1 | 4 | 0.4 | 13 | 0.8 | 45 | 0.962 | 12.1 |
| 8 | 1 | 5 | 0.4 | 13 | 0.8 | 45 | 0.962 | 12.1 |
| 9 | 1 | 6 | 0.4 | 13 | 0.8 | 45 | 0.962 | 12.1 |
| 10 | 1 | 7 | 0.4 | 13 | 0.8 | 45 | 0.962 | 12.1 |
| 11 | 1 | 8 | 0.6 | 13 | 0.8 | 70 | 0.962 | 12.1 |
| 12 | 1 | 9 | 0.4 | 13 | 0.8 | 45 | 0.962 | 12.1 |
| 13 | 1 | 10 | 0.4 | 13 | 0.8 | 45 | 0.962 | 12.1 |
| 14 | 4 | 1 | 0.6 | 13 | 0.8 | 70 | 0.962 | 8.2 |
| 15 | 5 | 1 | 0.4 | 13 | 0.8 | 70 | 0.962 | 12.0 |
| 16 | 6 | 1 | 0.4 | 13 | 0.8 | 70 | 0.970 | 3.8 |
| 17 | 7 | 1 | 0.4 | 13 | 0.8 | 70 | 0.972 | 2.8 |
| 18 | 8 | 1 | 0.4 | 13 | 0.8 | 70 | 0.950 | 20.0 |
| 19 | 1 | 11 | 0.4 | 13 | 0.8 | 45 | 0.962 | 12.1 |
| 20 | 1 | 12 | 0.4 | 13 | 0.8 | 45 | 0.962 | 12.1 |
| 21 | 1 | 1 | 0.1 | 13 | 0.8 | 25 | 0.962 | 12.1 |

Example 1

The evaluation was performed using the toner 1 in a low-temperature and low-humidity environment of a temperature of 15° C. and a humidity of 10% RH.

A modified machine of a commercially available laser beam printer "HP Color Laser Jet Enterprise 6701dn" (manufactured by HP) was used for evaluation. The modification was performed such that the process speed was set to 650 mm/sec by changing the software of the main body of the evaluation machine. Further, the rotation direction of the developing roller and the rotation direction of the toner supplying roller in the contact portion were set to be and the modified cartridge, and a monochrome image for determining ghosts was output. The image for determining ghosts is an image obtained by arranging seven 15 mm×15 mm solid images in a horizontal row at intervals of 15 mm in a position of 5 mm from the upper end of recording paper and setting the lower portion from these solid images as a halftone image with a toner bearing amount of 0.20 $mg/cm^2$. A difference in density caused by the 15 mm×15 mm solid images in the halftone portion of the image was visually determined. The results are listed in Table 5. Further, in the present evaluation, it was determined that the effects of the present disclosure were exhibited in a case of the rank B or higher.

Evaluation Criteria

A: No difference in density was observed.

B: A slight difference in density was observed.

C: A difference in density was observed, which was problematic in practical use.

D: A difference in density was clearly observed, which was problematic in practical use.

Examples 2 to 21 and Comparative Examples 1 to 7

The evaluation was performed in the same manner as in Example 1 except that the used toner, the movement directions of the developing roller and the toner supplying roller, and R were respectively changed as listed in Table 5. The evaluation results of Examples 2 to 21 and Comparative Examples 1 to 7 are listed in Table 5.

TABLE 5

| | | Toner | Movement direction of surface of developing roller and movement direction of surface of toner supplying roller in contact position | R | Evaluation results: Development stripes | Ghosts | Charge rising | |
|---|---|---|---|---|---|---|---|---|
| Example | 1 | 1 | Opposite | 1.3 | A | A | 0.01 | A |
| | 2 | 1 | Opposite | 1.2 | A | A | 0.02 | A |
| | 3 | 1 | Opposite | 1.1 | A | B | 0.03 | A |
| | 4 | 1 | Opposite | 1.5 | A | A | 0.01 | A |
| | 5 | 1 | Opposite | 2.5 | B | A | 0.01 | A |
| | 6 | 2 | Opposite | 1.3 | B | A | 0.02 | A |
| | 7 | 3 | Opposite | 1.3 | A | A | 0.01 | A |
| | 8 | 4 | Opposite | 1.3 | C | A | 0.05 | B |
| | 9 | 5 | Opposite | 1.3 | B | A | 0.03 | A |
| | 10 | 6 | Opposite | 1.3 | B | A | 0.09 | C |
| | 11 | 7 | Opposite | 1.3 | B | A | 0.03 | A |
| | 12 | 8 | Opposite | 1.3 | C | A | 0.08 | C |
| | 13 | 9 | Opposite | 1.3 | A | A | 0.02 | A |
| | 14 | 10 | Opposite | 1.3 | A | A | 0.05 | B |
| | 15 | 11 | Opposite | 1.3 | A | B | 0.06 | B |
| | 16 | 12 | Opposite | 1.3 | A | B | 0.08 | C |
| | 17 | 13 | Opposite | 1.3 | A | B | 0.09 | C |
| | 18 | 14 | Opposite | 1.3 | A | A | 0.02 | A |
| | 19 | 15 | Opposite | 1.3 | B | A | 0.05 | B |
| | 20 | 16 | Opposite | 1.3 | A | A | 0.01 | A |
| | 21 | 17 | Opposite | 1.3 | A | A | 0.04 | B |
| Comparative Example | 1 | 1 | Opposite | 0.9 | A | C | 0.05 | B |
| | 2 | 1 | Opposite | 2.6 | D | A | 0.01 | A |
| | 3 | 1 | Same | 1.3 | A | D | 0.09 | C |
| | 4 | 18 | Opposite | 1.3 | D | B | 0.06 | B |
| | 5 | 19 | Opposite | 1.3 | D | A | 0.07 | C |
| | 6 | 20 | Opposite | 1.3 | D | A | 0.04 | B |
| | 7 | 21 | Opposite | 1.3 | D | B | 0.11 | D |

Evaluation of Charge Rising Properties

Two sheets of monochrome solid images were output before the durability test was performed using the modified evaluation machine and the modified cartridge. The density was measured at 20 sites on the second image, and the initial charge rising properties were evaluated according to the following evaluation criteria based on the values (defined as density uniformity) of the differences in density between the maximum values and the minimum values. Further, the density was measured using an X-Rite color reflection densitometer (X-rite 500 Series, manufactured by X-rite, Inc.). The initial density uniformity on the second image and the density uniformity after the durability test on the 10000th image were evaluated according to the following evaluation criteria. The evaluation results are listed in Table 5.

Evaluation Criteria

A: The density uniformity was less than 0.04.

B: The density uniformity was 0.04 or greater and less than 0.07.

C: The density uniformity was 0.07 or greater and less than 0.10.

D: The density uniformity was 0.10 or greater.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-147439, filed Sep. 12, 2023 and Japanese Patent Application No. 2024-139815, filed Aug. 21, 2024, which are hereby incorporated by reference herein in their entirety.

What is claimed is:

1. A process cartridge that is attachable to and detachable from an image forming apparatus, the process cartridge comprising:

a developing chamber, wherein the developing chamber includes a toner, a developing roller that develops an electrostatic latent image with the toner, a regulating member that is disposed in contact with the developing roller and regulates a layer thickness of the toner carried by a surface of the developing roller, and a toner supplying roller that is disposed in contact with the developing roller and supplies the toner to the developing roller;

a driving force receiving unit provided at an axial end portion of the toner supplying roller;

a first driving force transmitting unit for transmitting a driving force from the driving force receiving unit to the toner supplying roller;

a second driving force transmitting unit provided in the toner supplying roller and used to transmit the driving force received by the first driving force transmitting unit to the developing roller; and a third driving force transmitting unit provided in the developing roller and used to transmit the driving force from the second driving force transmitting unit to the developing roller, wherein a movement direction of the surface of the developing roller is opposite to a movement direction of a surface of the toner supplying roller in a position where the surface of the developing roller is in contact with the surface of the toner supplying roller, wherein the developing roller and the toner supplying roller are configured such that a peripheral speed ratio R represented by Equation (E1) satisfies $$1.1 \leq R \leq 2.5,$$

$$R = V_{RS}/V_D \quad \text{(E1)}$$

(in Equation (E1), VRs represents an absolute value [m/sec] of a peripheral speed of the surface of the toner supplying roller, and VD represents an absolute value [m/sec] of a peripheral speed of the surface of the developing roller), wherein the toner contains a toner particle and an external additive A, wherein the toner has an average circularity of 0.955 or greater and 0.975 or less, a proportion of the particle having a circularity of 0.900 or greater and 0.930 or less in a circularity distribution of the toner is 2.0% by number or greater and 15.0% by number or less, and wherein the external additive A is a needle-like inorganic fine particle having a major axis of 100 nm or greater and 3000 nm or less, and a proportion of the toner particle having a surface where the external additive A is confirmed to be present is 30% by number or greater when the toner is observed using a scanning electron microscope.

2. The process cartridge according to claim 1, wherein the external additive A has an aspect ratio of 5.0 or greater.

3. The process cartridge according to claim 1, wherein the external additive A has a specific resistance of $1.0\times10^5$ Ω·cm or greater and $1.0\times10^8$ Ω·cm or less.

4. The process cartridge according to claim 1, wherein the external additive A is a titanium oxide particle.

5. The process cartridge according to claim 4, wherein the titanium oxide particle is a rutile type titanium oxide particle.

6. The process cartridge according to claim 1, wherein the toner particle contains boron, and a content of the boron is 0.1 ppm by mass or greater and 100 ppm by mass or less.

7. The process cartridge according to claim 1, wherein the process cartridge includes a toner accommodating unit for accommodating the toner, the developing chamber has a communication port that communicates with the toner accommodating unit, the toner accommodating unit is disposed below the developing chamber in a vertical direction, and the process cartridge includes a toner conveying member that conveys the toner accommodated in the toner accommodating unit onto the toner supplying roller through the communication port provided in the developing chamber.

8. The process cartridge according to claim 7, wherein the toner conveying member is a member that has elasticity and rotates to convey the toner, the toner conveying member is configured such that a free end of the toner conveying member is in contact with a wall surface of the toner accommodating unit in a region A upstream of the communication port in the rotation direction of the toner conveying member, the toner conveying member is deformed against the elasticity as the toner conveying member rotates such that the free end side rather than a rotation axis side is upstream in the rotation direction of the toner conveying member, and the free end of the toner conveying member is released from the contact with the wall surface of the toner accommodating unit in a position B which is downstream of the region A in the rotation direction of the toner conveying member and is upstream of the communication port in the rotation direction of the toner conveying member, and the toner conveying member is elastically restored to cause the conveyed toner to fly to the communication port, the position B is provided below a lower end of the communication port, a rotation center of the toner conveying member and a rotation center of the developing roller are positioned on the same side with respect to a vertical line passing through the position B as viewed in an axial line direction of the developing roller, and a maximum value of a radius of rotation of the toner conveying member is greater than a distance between the rotation center of the toner conveying member and the lower end of the communication port.

9. The process cartridge according to claim 1, wherein in a case where a radius of the developing roller is defined as rD [mm] and a radius of the toner supplying roller is defined as rRS [mm], the second driving force transmitting unit and the third driving force transmitting unit are connected to be driven such that a rotational angle speed ratio λ represented by Equation (E2) satisfies $$\lambda = \omega RS/\omega D \quad \text{(E2)}$$

(in Equation (E2), ωRS represents a rotational angle speed [rad/sec] of the toner supplying roller, and ωD represents a rotational angle speed [rad/sec] of the developing roller).

10. The process cartridge according to claim 1, wherein the peripheral speed ratio R satisfies 1.2≤R≤1.5.

* * * * *